United States Patent [19]
Mizuuchi et al.

[11] Patent Number: 5,221,310
[45] Date of Patent: Jun. 22, 1993

[54] METHOD OF MANUFACTURING WAVELENGTH CONVERSION DEVICE

[75] Inventors: Kiminori Mizuuchi, Hirakata; Kazuhisa Yamamoto, Settsu; Tetsuo Taniuchi, Kobe; Yoichi Sasai, Hirakata, all of Japan

[73] Assignee: Matsushita Electric Industrial Co., Ltd., Osaka, Japan

[21] Appl. No.: 796,648

[22] Filed: Nov. 22, 1991

[30] Foreign Application Priority Data

Nov. 30, 1990 [JP] Japan .................. 2-338107
Mar. 27, 1991 [JP] Japan .................. 3-062800

[51] Int. Cl.$^5$ .................. C03C 21/00; G02B 5/14
[52] U.S. Cl. .................. 65/30.13; 65/31; 65/33
[58] Field of Search .................. 65/30.1, 30.13, 31, 65/33

[56] References Cited

U.S. PATENT DOCUMENTS 4,196,963  4/1980  Chen et al. .................. 65/30.13 X
4,400,052  8/1983  Alferness et al. .................. 65/30.13 X

OTHER PUBLICATIONS

"Blue Light Generation By Frequency Doubling in Periodically Poled Lithium Niobate Channel Waveguide," Electronics Letters, vol. 25, No. 11, pp. 731–732, May 1989.

Nakamura, et al, "Ferroelectric Inversion Layers Formed By Heat Treatment of Proton-Exchanged LiTaO$_3$," Appl. Phys. Lett. vol. 56, pp. 1535–1536, Apr. 1990.

Sasson Somekh "Phase Matching by Periodic Modulation of the Nonlinear Optical Properties," Optics Communications, pp. 301–304, Nov. 1972.

Primary Examiner—Robert L. Lindsay
Attorney, Agent, or Firm—Stevens, Davis, Miller & Mosher

[57] ABSTRACT

A wavelength conversion device exhibiting an excellent wavelength conversion efficiency is provided by forming it in such a manner that an LiTaO$_3$ substrate is subjected to a proton exchange treatment to form a proton-exchange layer before the proton-exchange layer is subjected to heat treatment to form a domain-inverted structure. Heat treatment is performed at a high temperature rising speed to prevent the thermal diffusion of the proton-exchange layer so that the expansion of the domain-inverted structure to be formed in the proton-exchange layer is restrained. As a result, a higher harmonic wave wavelength conversion device can be provided.

8 Claims, 21 Drawing Sheets

WHEN TEMPERATURE RISING SPEED IS 1°C/SECOND

WHEN TEMPERATURE RISING SPEED IS 50°C/SECOND

F I G. 17a 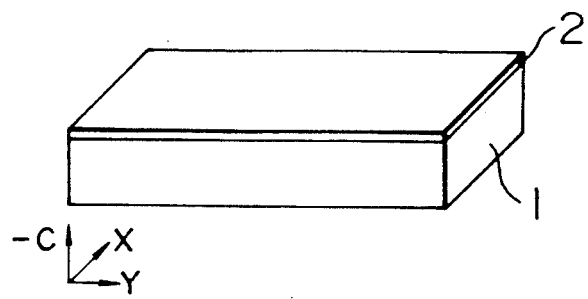
F I G. 17b 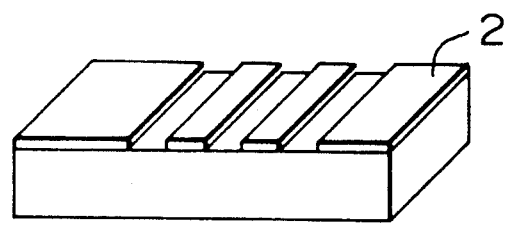
F I G. 17c 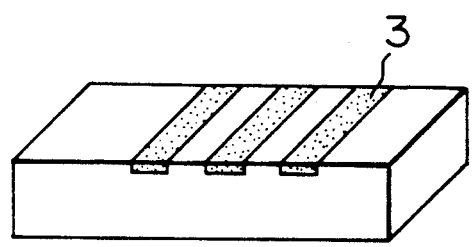
F I G. 17d 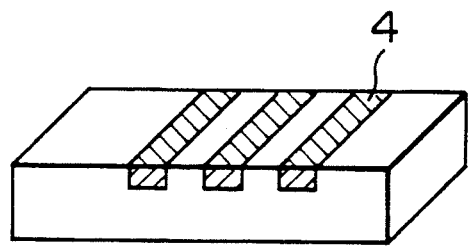
F I G. 17e 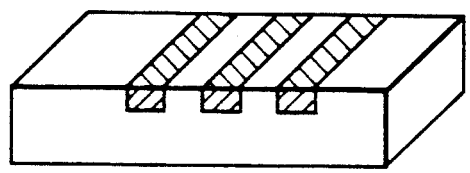

METHOD OF MANUFACTURING WAVELENGTH CONVERSION DEVICE

BACKGROUND OF THE INVENTION

1. Field of the Invention

The present invention relates to a method of manufacturing a wavelength conversion device which make use of a coherent light source for use in the industrial field of optical data storage, optical information processing and applied optic measurement control.

2. Description of Prior art

Domain inversion for forcibly inverting a domain in a ferroelectric is employed in optical frequency modulators which utilize surface acoustic waves and wavelength conversion devices which utilize the inversion of a non-linear domain in such a manner periodical domain-inverted structures are formed in a ferroelectric. In particular, by periodically inverting the non-linear domain of non-linear optical materials, a second harmonic generating device exhibiting an extremely high conversion efficiency can be manufactured. By using the second harmonic generating device thus-manufactured to convert a beam such as semiconductor laser, a small-size short wavelength light source can be realized which can be widely applied to the printing field, the optical information processing field, the applied optic measurement and control field and the like. Therefore, a large number of studies have been made about the domain inversion.

FIG. 21 is a structural view of a conventional light wavelength conversion device. Then, a detailed description will be made about generation of higher harmonic waves (wavelength of which is 0.41 $\mu$m) with respect to the fundamental waves the wavelength of which is 0.82 $\mu$m (refer to E. J. Lim, M. M. Fejer, R. L. Byer, and W. J. Kozlovsky, "Blue light generation by frequency doubling in periodically poled lithium niobate channel waveguide", Electron. Lett., 25,731-732, (1989)).

As shown in FIG. 21, an optical waveguide 44 is formed in an LiNbO$_3$ substrate 41 and a layer (a domain-inverted structure) 45 is formed in the optical waveguide 44, the domain of the layer 45 being periodically inverted. By compensating inconsistence in propagation coefficient between the fundamental waves and the higher harmonic wave with the periodic structure of the domain-inverted structure 45, the higher harmonic waves can be efficiently generated. When fundamental waves P1 (43) are made to be incident upon the entrance surface of the optical waveguide 44, higher harmonic waves P2 (42) are efficiently generated from the optical waveguide 44 so that the above-described structure is able to act as an optical wavelength conversion device.

An optical wavelength conversion device of the conventional type described above has been basically formed into a domain-inverted structure. Then, a method of manufacturing a device of the type described above will now be described with reference to FIGS. 22a to 22c. Referring to FIG. 22a, a Ti pattern 101 is formed on an LiNbO$_3$ substrate 100 composed of non-linear optical crystal at widthwise intervals of several milimeters by lifting-off and evaporation. Then, heat treatment at about 1100° C. is performed in a state shown in FIG. 22b so that a domain-inverted structure 102, the direction of the domain of the LiNbO$_3$ substrate 100 of which is inverted, is formed. Then, heat treatment is performed in benzoic acid (200° C.) for 20 minutes in a state shown in FIG. 22c, and then annealing is performed at 350° C. so that an optical waveguide 103 is formed. As a result, the optical wavelength conversion device manufactured by using the above-described benzoic acid treatment can produce higher harmonic waves P2, the power of which was 940 nW, with respect to fundamental wave P1, the wavelength of which was 0.82 mm, under conditions that the length of the optical waveguide was 1 mm and the power of the fundamental wave P1 was made to be 14.7 mW. At this time, a conversion efficiency of 0.43%/W was obtained. When 1 W of fundamental waves are made incident, higher harmonic waves of 370 mW can be delivered in a case where the length of the device is 10 mm. In this case, a device, the length of which is 10 mm, exhibits a conversion efficiency of 37%/W.cm$^2$ per W.

There has been disclosed a report in Appl. Phys. Lett. by Kiyoshi Nakamura, 1990, Vol. 56, p.p 1535 in which a fact was reported that a domain-inverted structure could be formed in an LiTaO$_3$ member. Referring to FIGS. 23a to 23b, reference numeral 104 represents an LiTaO$_3$ substrate, 105 represents a proton-exchange layer and 106 represents a domain-inverted structure. As shown in FIG. 23a, the domain-inverted structure is manufactured in such a manner that the LiTaO$_3$ substrate 104 is subject to heat treatment at 590° C. in benzoic acid so that the proton-exchange layer 105 is formed. Then, the LiTaO$_3$ substrate 104 is, as shown in FIG. 23c, subjected to heat treatment at 570° C. to 590° C. in the vicinity of the Curie point. As a result, the domain-inverted structure 106 is formed on the -C surface of the LiTaO$_3$ substrate 104. However, there has not been an idea of using the above-described structure for the wavelength conversion device.

The LiNbO$_3$ crystals involve problems of an optical damage. Also, variation in the refractive index of the waveguide due to a rise in the power density of light cannot be prevented, causing the phasematch condition to vary. Therefore, there is raised a problem in that a waveguide conversion device capable of stably operating and exhibiting excellent conversion efficiency can hardly be manufactured. Accordingly, studies have been made for the purpose of manufacturing the wavelength conversion device by forming a domain-inverted structure in LiTaO$_3$ crystal which are able to resist against the optical damage. Furthermore, the LiTaO$_3$ crystal exhibits excellent optical characteristics and the mixture of impurities can be satisfactorily prevented at the time of forming the crystal. Therefore, since the crystallization characteristics LiTaO$_3$ is superior to LiNbO$_3$, excellent optical damage resistance and DC drift resistance can be obtained and thereby it can be utilized as an advantageous optical material for an optical IC device. However, there arises a problem in that, although a slab-shaped inverted structure can be formed by the above-described method, a desired periodical domain-inverted structure cannot be formed in the LiTaO$_3$ crystal.

SUMMARY OF THE INVENTION

Accordingly, an object of the present invention is to provide a method of manufacturing a wavelength conversion device arranged in such a manner that a short period domain-inverted structure is formed in LiTaO$_3$ crystal and thereby capable of performing a conversion to short wavelength and as well as of efficiently converting the wavelength.

In order to achieve the above-described object, according to a first aspect of the invention, there is provided a method of manufacturing a wavelength conversion device comprising the steps of: forming a stripe-like mask on the surface of an LiTaO$_3$ substrate made of a C-plate (a substrate obtained by cutting a plane perpendicular to the C-axis of crystal); forming a proton-exchange layer in non-masked portions by subjecting the LiTaO$_3$ substrate to proton-exchange treatment so as to exchange Li and H$^+$ ions in the LiTaO$_3$ substrate; and forming a domain-inverted structure by subjecting the LiTaO$_3$ substrate to heat treatment by a heat treatment means.

According to a second aspect of the invention, there is provided a method of manufacturing a wavelength conversion device comprising the steps of: forming a stripe-like mask the period of which is $\Lambda$ and the stripe width of which is W (where W<$\Lambda$) on the surface of a LiTaO$_3$ substrate made of a C-plate; forming a proton-exchange layer having a depth of D in non-masked portions by subjecting the LiTaO$_3$ substrate to proton-exchange treatment to exchange Li and H$^+$ ions in the LiTaO$_3$ substrate; and forming a domain-inverted structure by heating the LiTaO$_3$ substrate at a temperature which is lower than the Curie point of LiTaO$_3$, wherein the thickness D of the proton-exchange layer holds a relationship 0.2 $\mu$m<D<($\Lambda$−W)/2.

According to a third aspect of the invention, there is provided a method of manufacturing a wavelength conversion device comprising the steps of: forming a stripe-like mask on the surface of an LiTaO$_3$ substrate made of a C-plate; exchanging Li and ions to be processed in the LiTaO$_3$ substrate in non-masked portions by subjecting the LiTaO$_3$ substrate to ion exchange treatment; performing domain inversion treatment in which the LiTaO$_3$ substrate is heated at a temperature which is lower than the Curie point thereof; and performing anneal treatment in which the LiTaO$_3$ substrate is heated at a temperature which is lower than 550° C.

As a result of the above-described methods according to the present invention, a periodic proton-exchange layer is formed in the LiTaO$_3$ substrate and it is heat treated at a high speed so that the heat treatment can be performed in a short time. As a result, a domain-inverted structure of a short period, which has not been able to be realized according to the convention structure, can be formed. Therefore, a wavelength conversion device capable of converting short waves and exhibiting a high efficiency can be manufactured. The reason for this will now be described.

The domain-inverted structure is formed in the LiTaO$_3$ crystal by forming the proton-exchange layer and then by heat treating it. When the proton exchange is performed, proton-exchange LiTaO$_3$ is formed, causing the Curie point of the portion, in which the proton-exchange LiTaO$_3$ is formed, to decrease. By heat treating the proton-exchange LiTaO$_3$ at a temperature which is lower than the Curie point of the LiTaO$_3$ crystal and which is as well as higher than the Curie point of the proton-exchange LiTaO$_3$, only the proton-exchange LiTaO$_3$ reaches the Curie point. As a result, the domain of the proton-exchange portion is inverted. Then, a selective proton exchange is performed by using a mask having proton-exchange resistance to form a periodic proton-exchange layer and it is heat treated so that the periodically domain-inverted structure is formed.

However, if the short period domain-inverted structure is manufactured, the distance between the adjacent domain-inverted structures is shortened. Since the proton-exchange layer is diffused due to the thermal diffusion, the diffusion of the proton-exchange layer is generated at the time of the temperature rise in the heat treatment operation and the heating operation. Therefore, the domain-inverted structure to be formed in the proton-exchange layer is also enlarged so that a problem takes place in that the adjacent domain-inverted structures are undesirably connected to each other in the lateral direction. As a result, a problem arises as shown in FIG. 24b in that the required periodical structure cannot be formed. Accordingly, the temperature rising speed at the time of the heat treatment is raised to complete the heat treatment in a short time and thereby the diffusion of the proton-exchange layer which can be taken place during the heat treatment is prevented. Therefore, the short period domain-inverted structure can be formed. As a result, a wavelength conversion device exhibiting a high efficiency and a large output and capable of performing the short-wavelength conversion can be manufactured.

According to the above-described method of the present invention, the relationship between the width W and period $\Lambda$ of the proton-exchange layer is restricted. Therefore, the width of the proton-exchange layer which will be diffused at the time of the heat treatment is controlled. As a result, forming of the short-period domain-inverted structure, which has not been realized according to the conventional method, can be formed. Therefore, a wavelength conversion device capable of performing the short wavelength conversion and exhibiting a high efficiency can be manufactured. The proton-exchange layer for forming the domain-inverted structure is widened in both depthwise and crosswise directions due to the diffusion at the time of the proton exchange treatment. Therefore, the depth of the proton exchange with respect to the interval of the mask pattern is restricted so that the lateral connection of the adjacent proton-exchange layers can be prevented. Furthermore, when the proton-exchange layer is heat treated for the purpose of forming the inverted layer the proton-exchange layer is diffused due to the heat treatment. However, a sufficiently high proton exchange density is required to form the domain-inverted structure. Therefore, a certain proton exchange depth is required to secure the proton exchange density at the time of the heat treatment. Therefore, the depth of the proton-exchange layer is arranged to be deeper than the depth which is required to form the domain-inversion. As a result, the periodically domain-inverted structure can be formed in LiTaO$_3$. As a result, a wavelength conversion device exhibiting a high efficiency and a large output and capable of converting short wavelength can be manufactured.

According to the above-described method of the present invention, the proton exchange treatment is partially applied to the LiTaO$_3$ crystal which exhibits an excellent non-linearity and a satisfactory optical damage resistance. Then, it is heated at a temperature which is lower than the Curie point and in the vicinity of the Curie point so that the periodically domain-inverted structure can be formed in the LiTaO$_3$ crystal. Furthermore, annealing is performed at a temperature lower than 550° C. so that the proton exchange density in the domain-inverted structure can be lowered while maintaining the shape of the domain-inverted structure. As a result, the reflective index of the domain-inverted structure can be set to a value adjacent to that of the substrate so that a low loss waveguide can be formed on the domain-inverted structure. As a result of the above-described processes, the periodic domain inversion can be formed and the difference in the reflective index between the domain-inverted structure and the substrate can be reduced. Consequently a low loss wavelength conversion device exhibiting a high conversion efficiency can be manufactured.

Other and further objects, features and advantages of the invention will be appear more fully from the following description.

BRIEF DESCRIPTION OF THE DRAWINGS

FIGS. 17a to 17h are perspective views which illustrate a method of manufacturing an optical waveguide according to the present invention;

DESCRIPTION OF THE PREFERRED EMBODIMENT

Prior to making a description about an example of the present invention, a wavelength conversion device in which a domain-inverted structure is formed will now be described.

Figure 1:
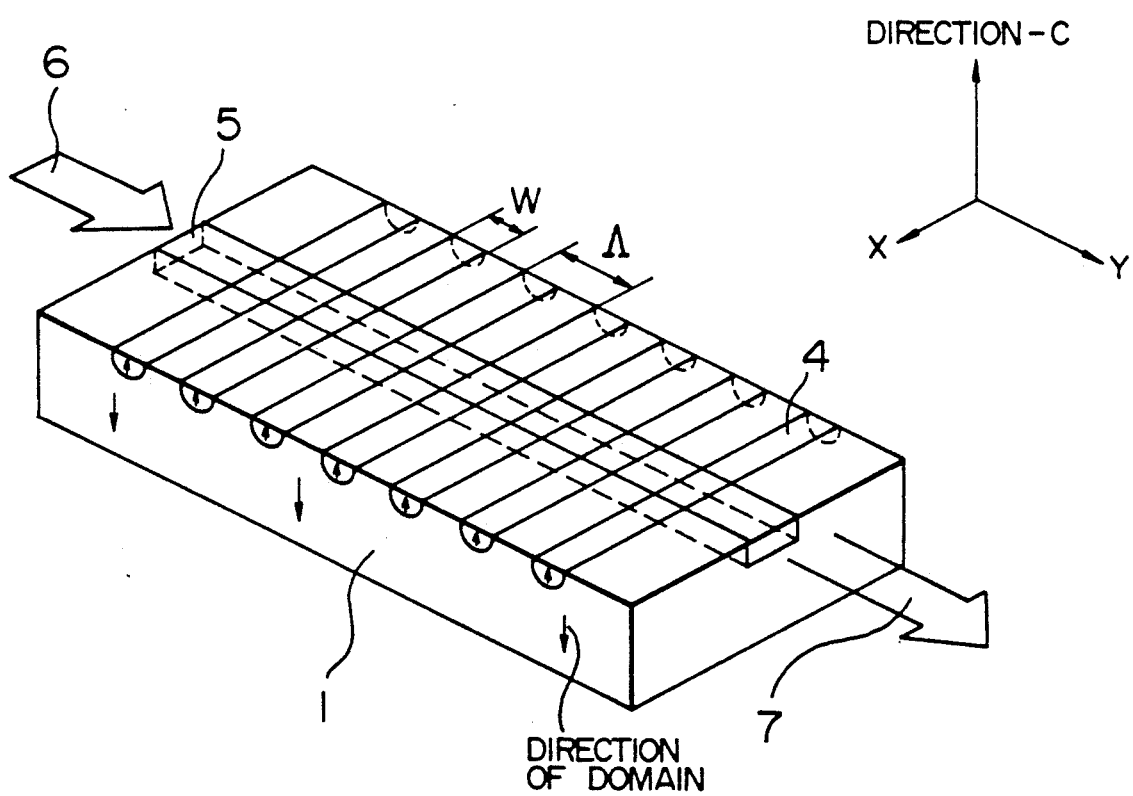
FIG. 1 is a view which illustrates the structure of an example of a wavelength conversion device according to the present invention.

FIG. 1 is a structural perspective view which illustrates the wavelength conversion device. Reference numeral 1 represents a —C plate LiTaO$_3$ substrate, 4 represents a domain-inverted structure, 5 represents a proton-exchange waveguide, 6 represents fundamental waves the wavelength of which is 860 nm and 7 represents a second higher harmonic waves (hereinafter called "SHG light") the wavelength of which is 430 nm. As shown in FIG. 1, the domain-inverted structure 4 is formed at a pitch of Λ and having a width of W.

Referring to FIG. 1, the domain-inverted structure 4 is a portion the direction of the domain of which is inverted with respect to the domain inversion of the substrate. In a case of the LiTaO$_3$ substrate 1, the direction of the domain is in a direction of +C, while the direction of the domain in the domain-inverted structure is —C. The period Λ of the domain-inverted structure becomes different depending upon the wavelength of the fundamental waves and the refractive index of the waveguide. In a case where the wavelength of the fundamental waves is 860 nm, the first-order period is about 3.6 μm, while the third-order period is 10.8 μm which is three times as large as the first-order period (the period of the domain inversion being an odd number times the first-order period.) A phasematch condition is realized in the domain inversion and therefore the wavelength conversion can be performed only when the period coincides with the odd number times as large as the period. However, the conversion efficiency is lowered by a factor of the square of the order in accordance with an increase in the order.

Figure 2:
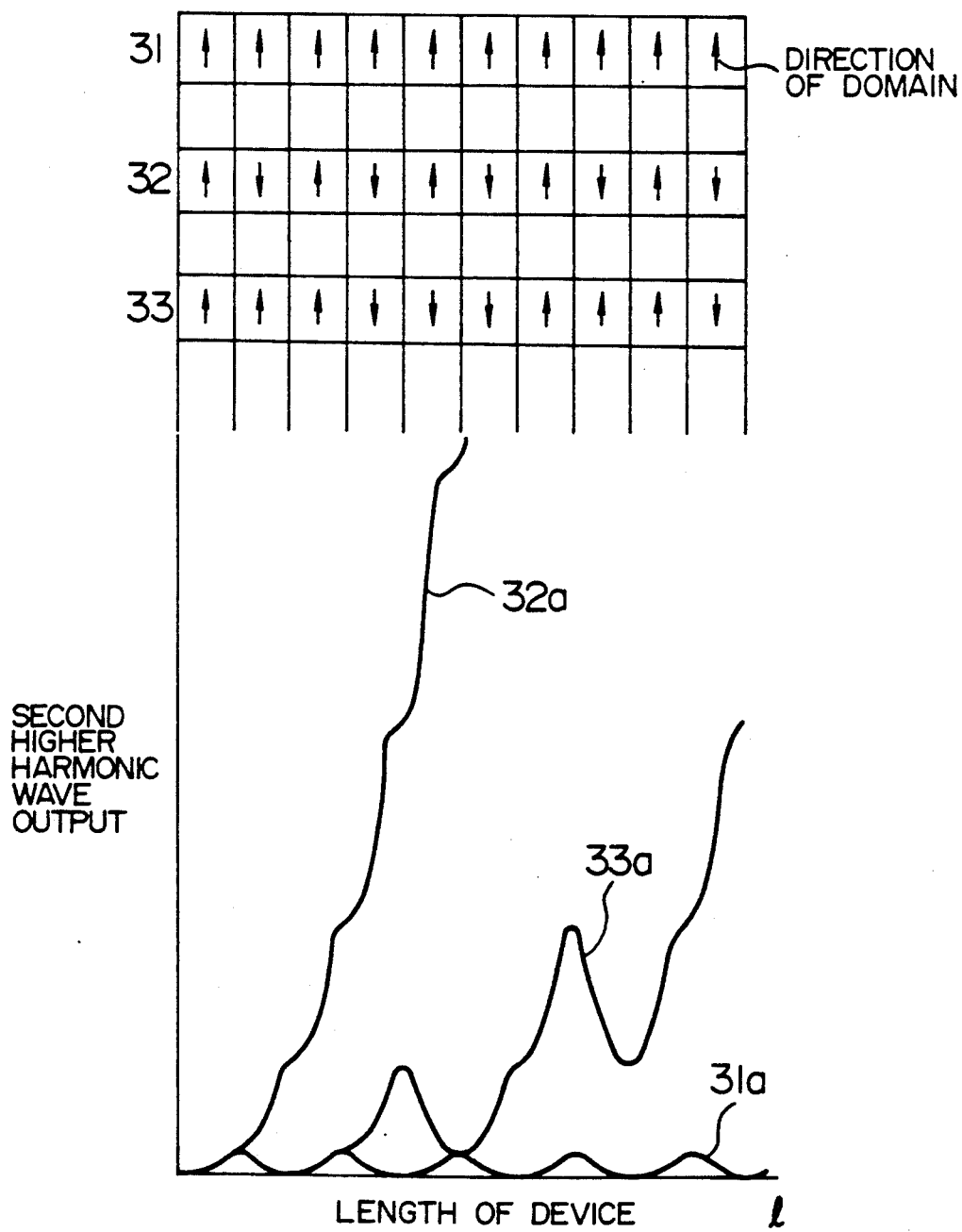
FIG. 2 is a graph which illustrates outputs of second harmonic waves from a device the domain of which is not inverted, a domain-inverted device of a first-order period and a domain-inverted device of a third-order period.

FIG. 2 illustrates the relationship between the length (l) of a device 31 the domain of which is not inverted, that of a first-order period domain-inverted device 32 and that of a third-order period domain-inverted device 33 and the output of SHG light. As shown in FIG. 2, SHG light outputs 32a and 33a from the first-order and the third-order domain-inverted devices increase in proportion to the square of the length (l) of the devices. The output is in inverse proportion to the order of the period, and the maximum efficiency is shown at the domain inversion period of the first-order, which is the lowest order. The first-order $\Lambda 1$ in this case is expressed as follows assuming that the effective refractive index of the fundamental wave (wavelength $\lambda$) is $N\omega$ and the effective refractive index of the higher harmonic waves (wavelength $\frac{\lambda}{2}$) is $N2\omega$: $\Lambda 1 = \lambda/(2\ (N2\omega - N\omega))$, while the third-order period $\Lambda 3$ is three time as large as the first-order period $\Lambda 1$, that is, $\Lambda 3 = 3 * \Lambda 1$. In this state, the effective refractive index is the one at which light can be actually sensed.

Figure 3:
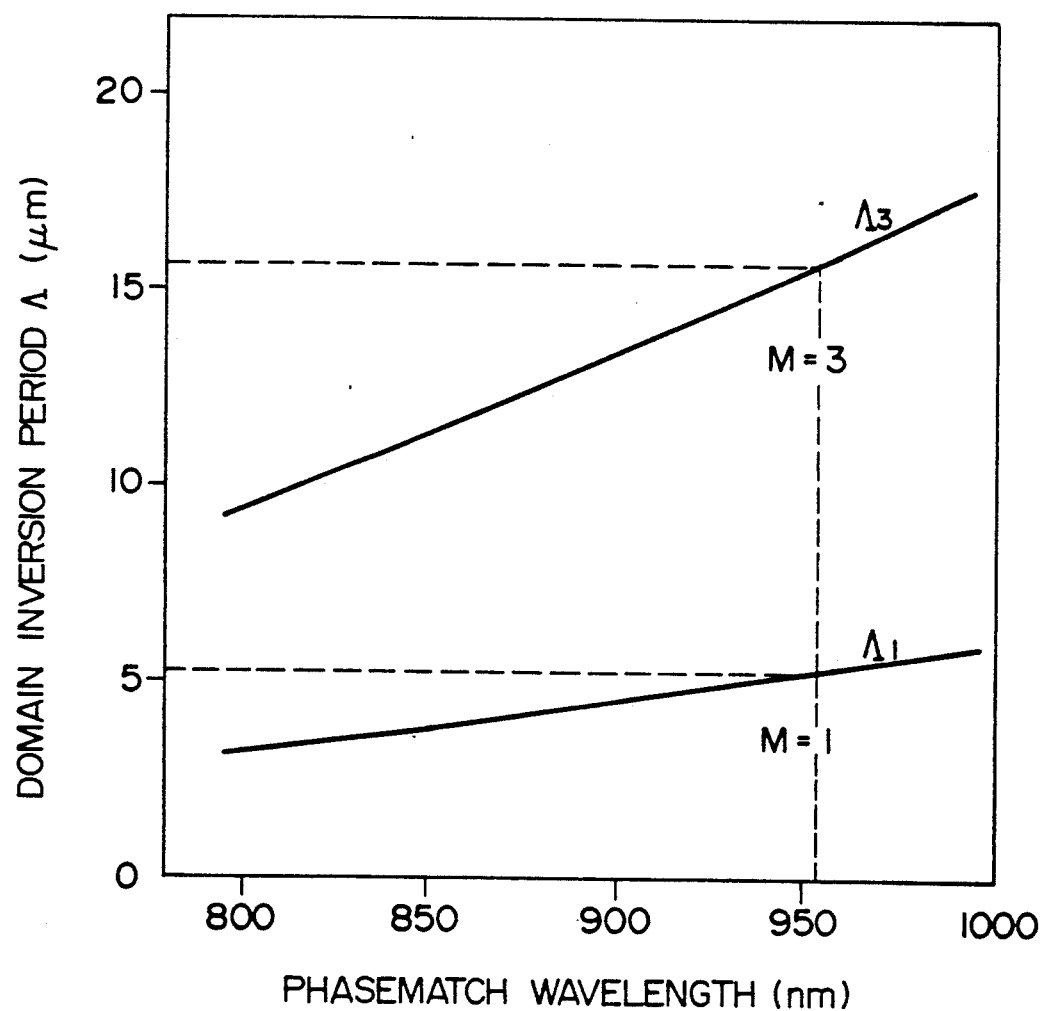
FIG. 3 is a graph which illustrates the relationship between the phasematch wavelength and the phasematch period.

On the other hand, there is desired blue light the wavelength of which is 480 nm or less suitable for compact disks or optical memories. Therefore, it is particularly significant that a wavelength conversion device capable of generating blue light is formed. FIG. 3 illustrates the relationship between the domain inversion periods such as first-order period $\Lambda 1$ (expressed as $M=1$) and third-order period $\Lambda 3$ (expressed as $M=3$) and the phasematch wavelength. Since the wavelength of transmitted SHG light is one-half of the phasematch wavelength, the fundamental wave must have a wavelength of 960 nm or less if a wavelength of 480 nm or less is desirable.

The shorter the phasematch wavelength, the shorter the period of the domain-inverted structure becomes and accordingly the domain-inverted structure must have the third-order period of 15 $\mu$m or less and the first-order period of 5 $\mu$m in order to obtain blue light whose wavelength is 480 nm or less.

Then, an example of the present invention will now be described. First, a method of manufacturing the waveguide conversion device according to the present invention will now be schematically described.

The method comprises the following two steps:

(1) Proton-exchange layers are periodically formed on a LiTaO$_3$ substrate.

(2) The proton-exchange layers are turned into so as to have a domain-inverted structure by heat treatment.

Then, examples according to the present invention will now be described with reference to the drawings.

EXAMPLE 1

A method of manufacturing the waveguide conversion device having the domain-inverted structure will now be described.

Figure 23A:
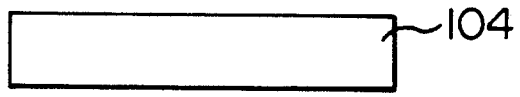
FIG. 23a to 23c are cross-sectional views which illustrate a method of manufacturing a conventional LiTaO$_3$ domain-inverted structure.
Figure 23B:
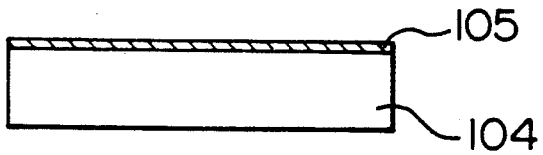
Figure 23C:
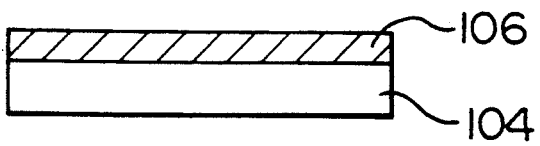
Figure 24A:
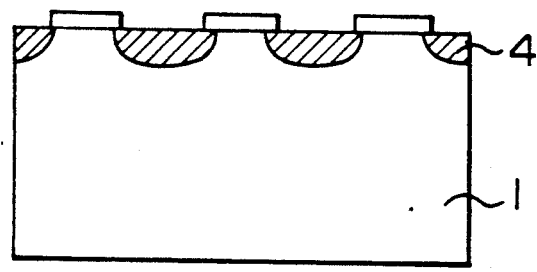
FIG. 24a and 24b which are cross-sectional views which illustrate a crosswise expansion of the domain-inverted structure.
Figure 24B:
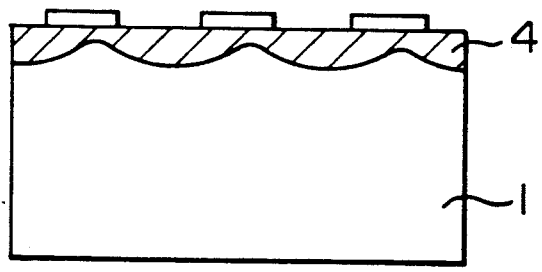

The inventors of the present invention studied the formation of the periodically domain-inverted structure in LiTaO$_3$, which is necessary for manufacturing a wavelength conversion device. A fact has been already confirmed that, as shown in the conventional example shown in FIGS. 23a to 23c, a layer-shape (slab-like) domain-inverted structure can be formed by subjecting LiTaO$_3$ to proton exchange by using benzoic acid before it is heat treated in the vicinity of the Curie point of LiTaO$_3$. Therefore, the formation of the periodically domain-inverted structure was tried by a method in which the surface of the LiTaO$_3$ substrate was subjected to a selectively proton exchange to form a periodic proton-exchange layer in the LiTaO$_3$ substrate and thereafter it is heat treated.

Since the proton exchange density and the uniformity of the proton-exchange layer affect the shape and the uniformity of the domain-inverted structure to be formed, pyrophosphoric acid exhibiting a high proton exchange rate and capable of forming a uniform proton exchange layer was used to perform the proton exchange.

In order to selectively perform the proton exchange, a mask capable of satisfactorily preventing the proton must be used. Therefore, the mask is made of Ta the selection ratio of which can be made to be substantially infinite so that a selectively proton-exchange layer was manufactured.

FIGS. 4a to 4e are cross sectional views which illustrate the process of manufacturing the wavelength conversion device according to Example 1. Referring to FIGS. 4a to 4e, reference numeral 1 represents an LiTaO$_3$ substrate formed of a C-plate, 2 represents a Ta mask, 3 represents a proton-exchange layer, 4 represents a domain-inverted structure, 8 represents the width W of the mask and 9 represents the period $\Lambda$ of the domain-inverted structure (Specifically, the period $\Lambda$ is set to 1 to 20 $\mu$m and the width is set to N2). Then, the manufacturing method will now be described with reference to FIG. 4.

Figure 4A:
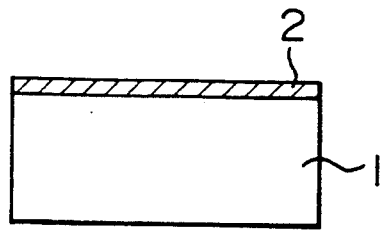
FIGS. 4a to 4e are views which illustrate the wavelength conversion device according to the present invention.
Figure 4B:
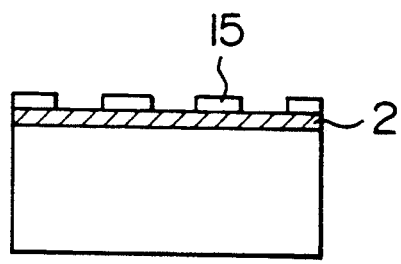

Referring to FIG. 4a, the Ta mask 2 is formed to have a thickness of 300Å on the C-plate LiTaO$_3$ substrate 1 by the sputtering method. Referring to FIG. 4b, a photoresist is applied to the Ta mask 2 before stripes having width W are formed by the ordinary photolithography method at a period of $\Lambda$ in the Y-transmission direction of the substrate (according to this example, period $\Lambda$ was 1 to 20 $\mu$m and W was 1 to 20 $\mu$m and W was $\Lambda/2$).

Figure 4C:
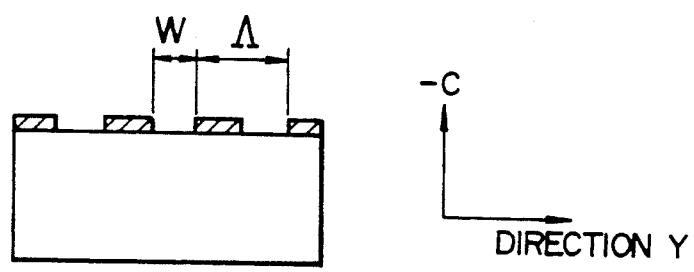

Referring to FIG. 4c, the pattern of the resist is transferred to the Ta mask 2 by dry etching in an atmosphere of CF$_4$.

Figure 4D:
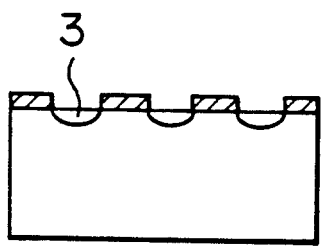

Referring to FIG. 4d, the proton-exchange layer 3 is formed in pyrophosphoric acid of a temperature of 260° C.

Figure 4E:
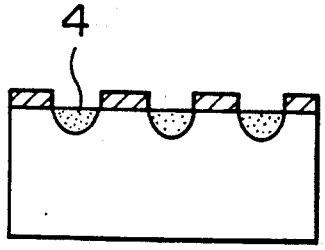

Referring to FIG. 4e, the LiTaO$_3$ substrate 1 is heat treated. By using a heating furnace arranged to act in accordance with an ordinary heater heating operation, the temperature rising speed was about 1° C./second.

According to the above-described method, the periodic domain-inverted structure 4 the period of which was 8 to 20 $\mu$m was formed. Since the processes shown in FIGS. 4a to 4c are well known, the processes shown in FIGS. 4d and 4e will now be described in detail.

The process of manufacturing the proton-exchange layer shown in FIG. 4d will now be described.

Figure 14A:
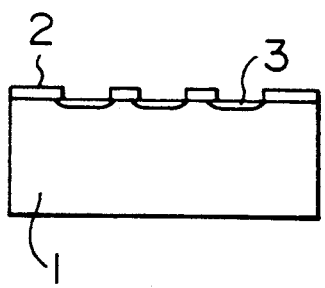
FIGS. 14a to 14c are cross sectional views which illustrate the wavelength conversion device in which a proton-exchange layer is expanded.
Figure 14B:
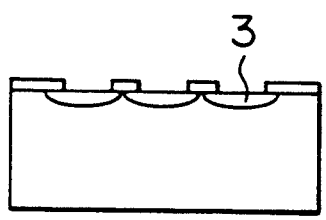
Figure 14C:
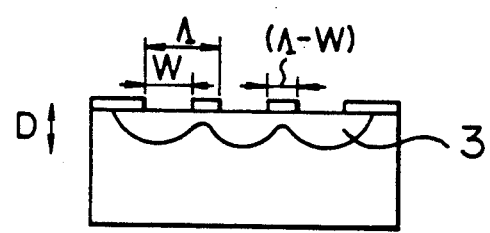

FIGS. 14a to 14c are cross sectional views which illustrate the cross-section of the proton-exchange layer formed by a method for manufacturing the wavelength conversion device. Referring to the drawings, reference numeral 1 represents an LiTaO$_3$ substrate, 2 represents a Ta mask and 3 represents a proton-exchange layer. By performing the heat treatment with the use of pyrophosphoric acid, the proton-exchange layers 3 are formed in the non-mask portions.

FIGS. 14a to 14c illustrate states of diffusion of the proton-exchange layer when the proton-exchanged time is lengthened as 20 minutes, 1 hour and three hours at the proton exchange temperature of 260° C.

As shown in the drawings, also the proton-exchange layer 3 expands in the direction of the depth and in the widthwise direction similarly to the domain-inverted structure 4. The expansion of the proton-exchange layer 3 progresses in both depthwise and crosswise directions at substantially the same speed. Therefore, in order to form the periodically proton-exchange layer 3 for the purpose of forming the periodically domain-inverted structure 4, it is necessary to make thickness D of the proton-exchange layer 3 to be one-half or less than the space between the proton-exchange layer 3 and the mask 2 for forming the proton-exchange layer 3 (which is equal to the difference $(\Lambda-W)$ between the period and the width W of the domain-inverted structure). If the proton-exchange layer 3 is formed in such a manner that its thickness D is larger than the above-described value, the adjacent proton-exchange layers 3 are undesirably connected to each other. As a result, the desired periodically proton-exchange layer 3 cannot be formed and thereby the periodically domain-inverted structure 4 cannot be formed.

Figure 15:
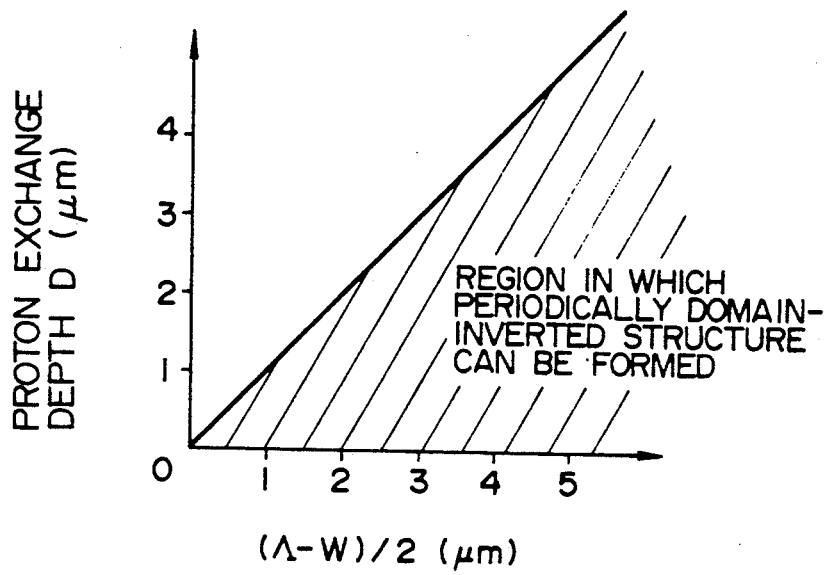
FIG. 15 is a graph which illustrates the relationship between the interval of the proton-exchange masks and the region in which the domain-inverted structure can be formed.

The relationship between the distance between the stripes of the proton-exchange mask 2 (which is the same as the difference $(\Lambda-W)$ between the period $\Lambda$ and the width W of the domain-inverted structure 4) and the region in which the domain-inverted structure can be formed is as shown in FIG. 15. As can be seen from FIG. 15, the proton exchange depth D must be $(\Lambda-W)/2$ or less.

Figure 16:
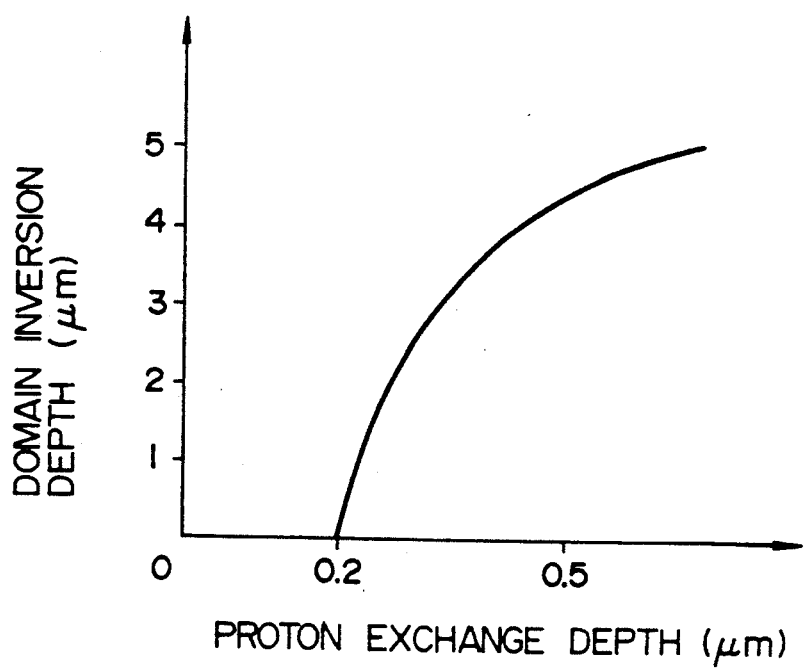
FIG. 16 is a graph which illustrates the relationship between the depth of the domain-inverted structure and the proton-exchange layer depth D.

FIG. 16 illustrates the relationship between the depth of the domain-inverted structure 4 and that of the proton-exchange layer 3. Referring to FIG. 16, the abscissa stands for the thickness of the proton-exchange layer 3 and the ordinate stands for the thickness of the domain-inverted structure 4 having a width of 10 μm. As shown in FIG. 16, if the thickness of the proton-exchange layer 3 is 0.2 μm or less, the domain-inverted structure 4 cannot be formed. In order to form the domain-inverted structure 4, the Curie point of the subject portion must be lowered during the proton exchange, the lowering of the Curie point being in proportion to the proton exchange density. Therefore, in order to form the domain-inverted structure 4, the proton exchange density must be maintained at a certain value or higher. It is considered that if the thickness of the proton-exchange layer 4 is 0.2 μm or less, the proton exchange density cannot be maintained in a case where the proton-exchange layer 3 is widened during the heat treatment. Therefore, the domain-inverted structure 4 cannot be formed.

As a result, it was found that thickness D of the proton-exchange layer 3 must hold the relationship $0.2 \mu m < D < (\Lambda-W)/2 \mu m$ in order to form the domain-inverted structure 4, where $\Lambda$ is the period of the proton-exchange mask and W is the width of the proton exchange mask.

By forming the proton-exchange layer 3 under the above-described conditions, the domain-inverted structure 4 can be formed in the LiTaO$_3$ crystal.

Figure 5:
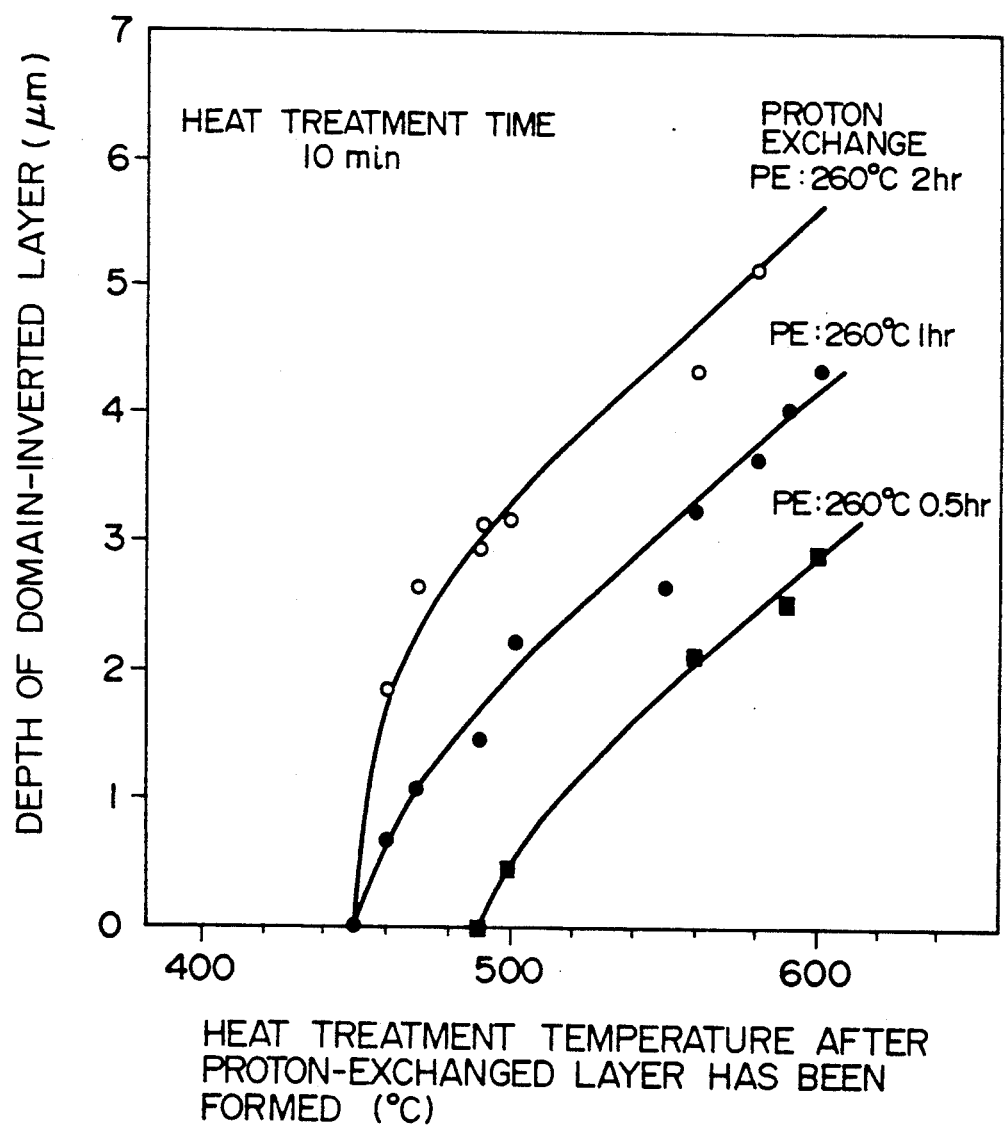
FIG. 5 is a graph which illustrates the relationship between the heat treatment temperature and the depth of the domain-inverted structure.

FIG. 5 illustrates the relationship between the heat treatment temperature for the proton-exchange layer 3 and the depth of the domain-inverted structure 4 the period of which was 20 μm and which was realized by the process of manufacturing the domain-inverted structure 4 shown in FIG. 4e.

The depth of the domain-inverted structure 4 is in proportion to the rise of the temperature. However, if the heat treatment temperature exceeds 600° C., the periodically domain-inverted structure 4 is eliminated. The reason for this lies in that the domain of the overall body of the substrate was inverted because the heat treatment temperature has exceeded the Curie point (the Curie point of the substrate employed was 604° C.) of the LiTaO$_3$ substrate. Although the lowest temperature at which the domain-inverted structure 4 can be formed lowers as the proton exchange increases, it is saturated at about 450° C.

As a result, it can be understood that the domain inverted structure 4 can be formed by the heat treatment at a temperature of 450° to 600° C.

With the thus-arranged manufacturing method, although the domain-inverted structure 4 the period of which was 8 to 15 μm could form the third-order domain inversion, it was difficult to form the domain-inverted structure 4 the period of which was 5 μm or less which was required to realize the first-order domain inversion. The reason for this lies in that, although the domain-inverted structure 4 is manufactured by subjecting the proton-exchange layer 3 to the heat treatment at 450° to 600° C., the proton-exchange layer 3 is widened due to the heat diffusion before the heat treatment temperature reaches 450° or higher and thereby the adjacent domain-inverted structures 4 are undesirably connected to each other in a case where a short-period domain-inverted structure 4 is formed. Therefore, the short-period domain-inverted structure 4 could not be formed.

EXAMPLE 2

Accordingly, the method of manufacturing the wavelength conversion device according to this example is arranged in such a manner that a high speed temperature raising apparatus is used to perform the heat treatment required to form the domain-inverted structure so as to shorten the time taken to raise the temperature to a required level for the heat treatment at which the domain is inverted, and accordingly the heat diffusion of the proton-exchange layer 3 is prevented so that the crosswise diffusion of the domain-inverted structure 4 formed in the proton-exchange layer 3 at the time of the heat treatment is prevented.

As a result, the short-period of the domain-inverted structure 4 can be formed in the LiTaO$_3$ substrate so that a waveguide conversion device capable of conversion of short wavelength and of exhibiting of an excellent efficiency is manufactured.

FIGS. 4a to 4e are cross-sectional views which illustrate the method of manufacturing the waveguide conversion device.

Referring to FIG. 4a, the Ta mask 2 having a thickness of 300Å is formed on the C-plate LiTaO$_3$ substrate 1 by sputtering.

Referring to FIG. 4b, a photoresist is applied to the surface of the Ta mask 2 before stripes the width of which is W are formed on the substrate 1 at a period $\Lambda$ in a length of 10 mm in the Y-transmission direction by an ordinary photolithography method (the period $\Lambda$ was 1 to 50 μm and W was $\Lambda/2$).

Referring to FIG. 4c, a resist pattern is transferred to the Ta mask 2 by dry etching in an atmosphere of CF$_4$.

Referring to FIG. 4d, the proton-exchange layer 3 is formed by performing the heat treatment in pyrophosphoric acid of 260° C. for 20 min.

Referring to FIG. 4e, the LiTaO$_3$ substrate 1 is heated in a high speed temperature raising heating furnace.

The processes shown in FIGS. 4a to 4d according to this example are the same as those according to Example 1 excepting that the heat treatment process shown in FIG. 4e is performed in a high speed temperature raising manner. By performing the heat treatment in the high speed temperature raising manner, the undesirable crosswise expansion of the domain-inverted structure 4 can be prevented.

Prior to describing the result of forming the domain-inverted structure 4 by heat treating the proton-exchange layer 3 in the high speed temperature raising manner, the mechanism of forming the domain-inverted structure 4 will now be described.

Mechanism of Forming Domain-Inverted Structure 4

Figure 6A:
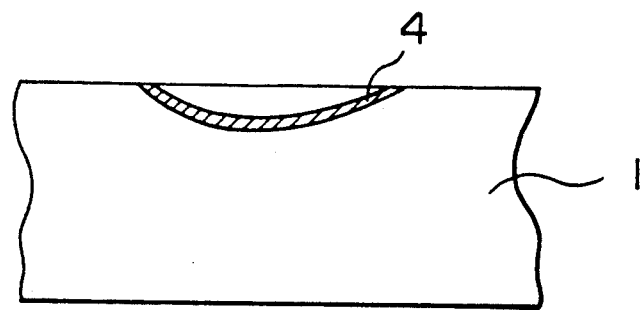
FIGS. 6a to 6d are views which illustrate change in the heat treatment time and the cross-sectional shape of the domain-inverted structure depending upon a time of heat treatment.
Figure 6B:
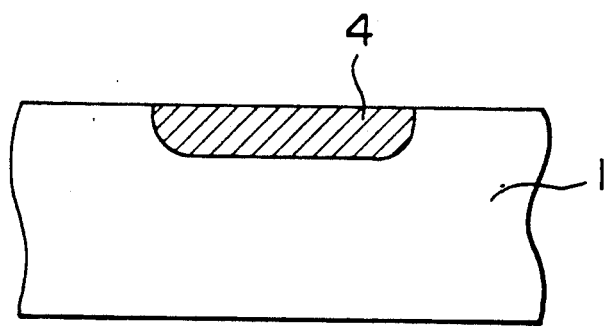
Figure 6C:
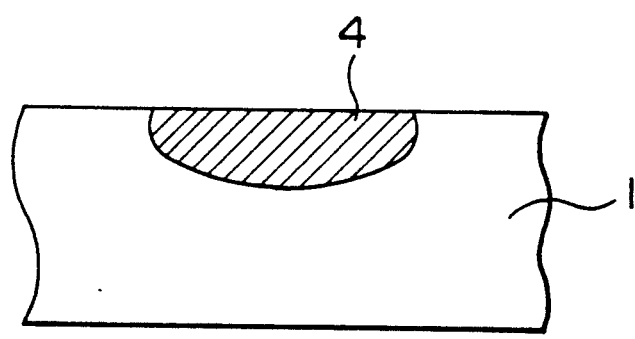
Figure 6D:
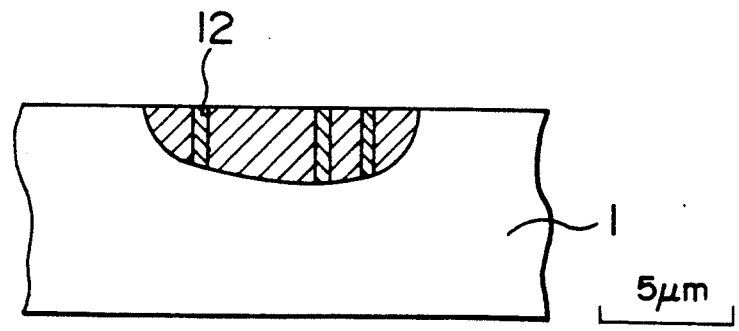

The result of an observation of the formed domain-inverted structure 4 is shown in FIGS. 6a to 6d. FIGS. 6a to 6d are cross sectional views of the domain-inverted structure 30 subjected to the heat treatment for 30 seconds, 1 minute, 2 minutes and 8 minutes at 520° C. after the proton exchange. As can be understood from FIG. 6a, the domain-inverted structure 4 was formed on the interface (between the proton-exchange region and the substrate) of the proton-exchange layer 3. When the heat treatment is continued, the domain-inverted structure 4 is widened around the above-described layer as shown in FIGS. 6b and 6c so that a semicircular domain-inverted structure 4 is formed. That is, the domain-inverted structure 4 is generated between the proton-exchange layer 3 and the substrate 1 at the position of the boundary between the proton-exchange layer 3 and the substrate 1 where the electric field is strongest. The above-described generation of it triggers the expansion of the domain-inverted structure 4 which becomes larger as the heat treatment time increases. The expansion of the domain-inverted structure 4 is stopped if the heat treatment is continued. When the heat treatment was further performed, the generation of microdomains was observed in the domain-inverted structure 4. The microdomains are of a needle-like re-inverted structure which is generated by re-inversion of a layer the domain of which has been inverted, the microdomain having a domain direction which is the same as that of the substrate 1. The microdomain causes non-uniformity of the domain of the domain-inverted structure 4. The larger the annearling time in the ordinary annealings operation, the greater the non-uninformity in the layer would become. However the uniform domain-inverted structure 4 could be formed by subjecting the domain-inverted structure 4 to a short-time heat treatment.

Short Period Domain-Inverted Structure

Figure 7:
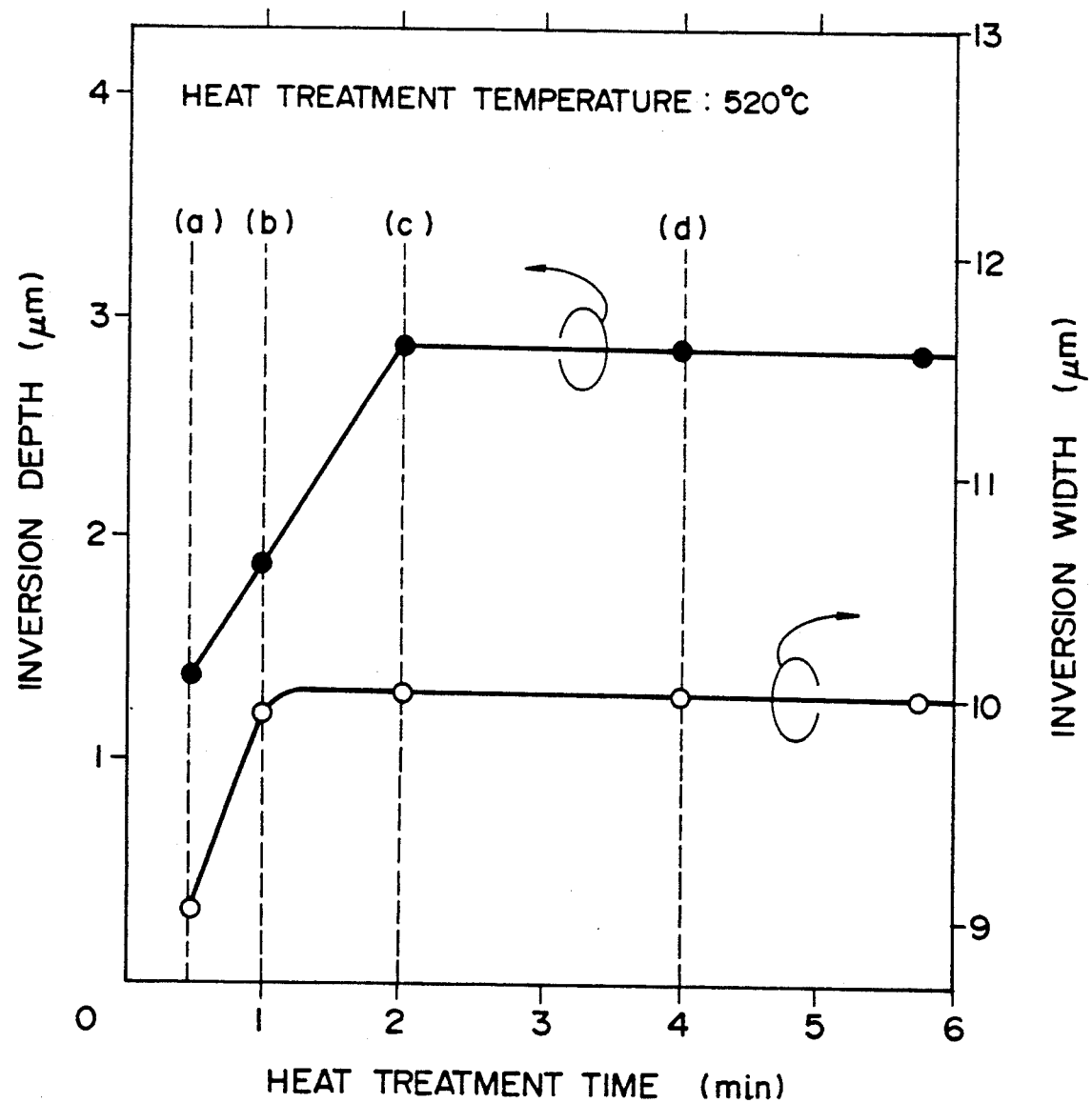
FIG. 7 is a graph which illustrates the relationship between the heat treatment time and the width and the depth of the domain-inverted structure.

FIG. 7 shows the result of measurement of the relationship between the heat treatment time and the measured width and depth of the domain-inverted structure 4. The width of the domain-inverted structure 4 was diffused at a speed of about 1 μm/minute before it was saturated in about 2 minutes. Furthermore, a fact was found that, although the temperature, at which the domain-inverted structure 4 is, as described with reference to FIG. 5, formed, is about 450° C. to 600° C. which is in the vicinity of the Curie point of the LiTaO$_3$ substrate, the proton-exchange layer 3 undesirably expands due to the heat diffusion before the above-described temperature is attained, if the temperature rising speed is too slow, thereby the short-period domain-inverted structure 4 can hardly be formed.

Therefore, the inventors of the present invention established a method of forming the domain-inverted structure 4 by performing heat treatment in accordance with RTA (Rapid Thermal Annealing). RTA is a method of heating a specimen at high speed with infrared rays and is a method capable of performing heating from a very low speed to a high speed of 50° C./second or higher while maintaining excellent controllability. Therefore, such a trial was made that the periodically domain-inverted structure 4 is formed by RTA when the proton-exchange layer 3 is heat treated in the method of forming the domain-inverted structure 4.

Figure 8:
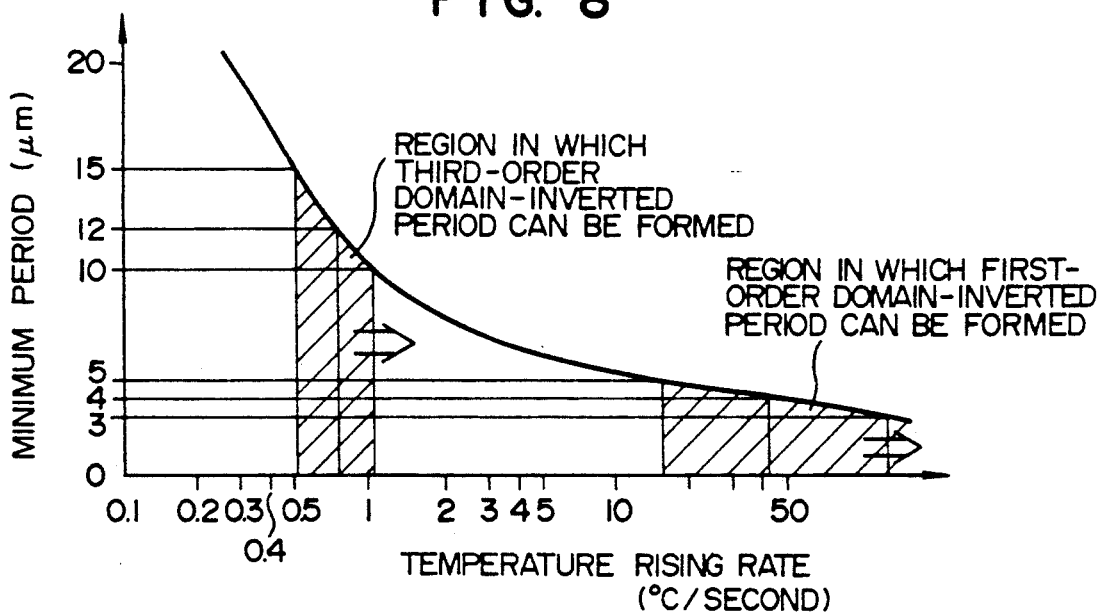
FIG. 8 is a graph which illustrates the relationship between the temperature rising speed during the heat treatment and the domain-invertion period which can be formed.

As a result of the heat treatment by RTA, the high speed temperature rising and the short-time heat treatment were enabled. FIG. 8 illustrates the obtained relationship between the temperature rising speed in the heat treatment and the shortest period of the domain-inverted structure 4 which can be formed.

The temperature rising speed at the time of the required heat treatment was obtained from the relationship, as shown in FIG. 8, between the temperature rising speed and the minimum domain inversion period which can be realized. As a result, a fact was found that a speed of 0.5° C./second or more was required for the third-order domain-inverted structure and 15° C./second or more was required for the first-order domain-inverted structure.

As a result, in order to manufacture a large-output and high-efficiency wavelength conversion device, heating must be performed at a temperature rising speed of 0.5° C./second or higher. In order to realize the first-order domain inversion capable of performing further efficient wavelength conversion, heating must be performed at a temperature rising speed of 15° C./second or higher. However, since the temperature rising speed, which can be realized by using an ordinary furnace, is 1° C./second or lower, the first-order domain-structure cannot be realized but the third-order domain-inverted structure having the period of about 10 μm can be realized. However, a high speed heating of 50° C./second or higher can be performed by performing RTA. Therefore, a first-order domain-inverted structure the period of which was 4 μm or less could be formed. The reason for this lies in that the diffusion of the proton layer which can be generated at the time of the heat treatment of the proton-exchange layer can be restrained by virtue of the high speed temperature rise and the short time heat treatment. Therefore, the crosswise enlargement of the domain-inverted structure can be restrained and thereby the short-period domain-inverted structure can be formed. As a result, the waveguide conversion device of the first-order domain inversion structure exhibiting excellent efficiency could be manufactured.

Depth of Domain-Inverted Structure

Figure 9A:
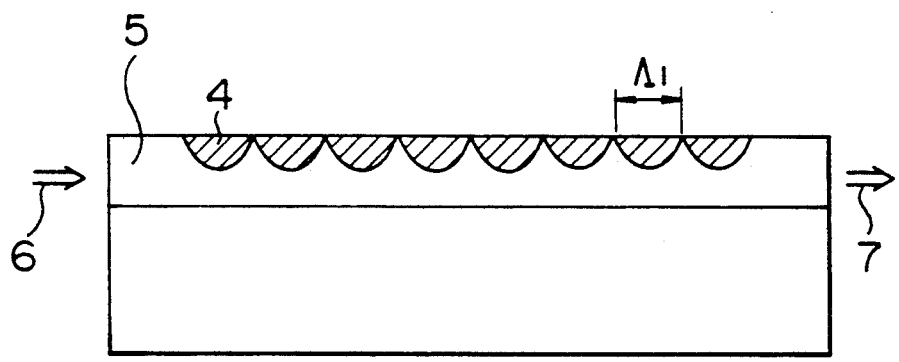
FIGS. 9a and 9b are views which illustrate the cross-section of the wavelength conversion device.
Figure 9B:
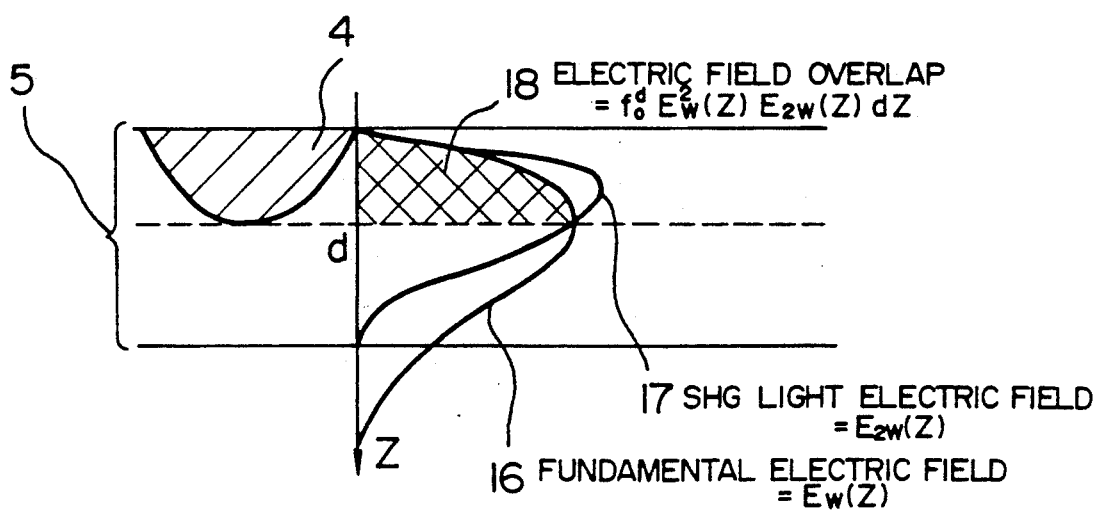
Figure 10A:
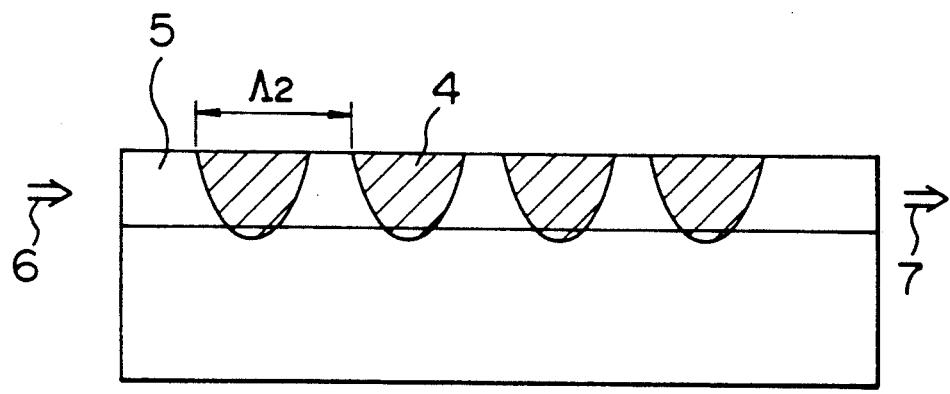
FIGS. 10a and 10b are views which illustrate the cross-section of the wavelength conversion device.
Figure 10B:
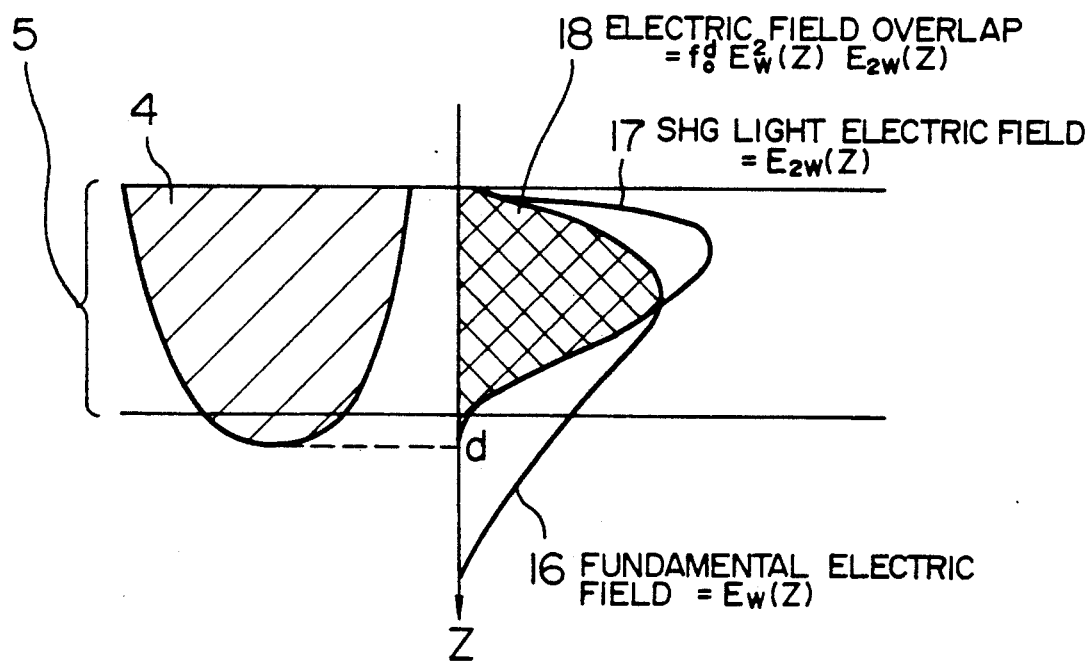
Figure 11:
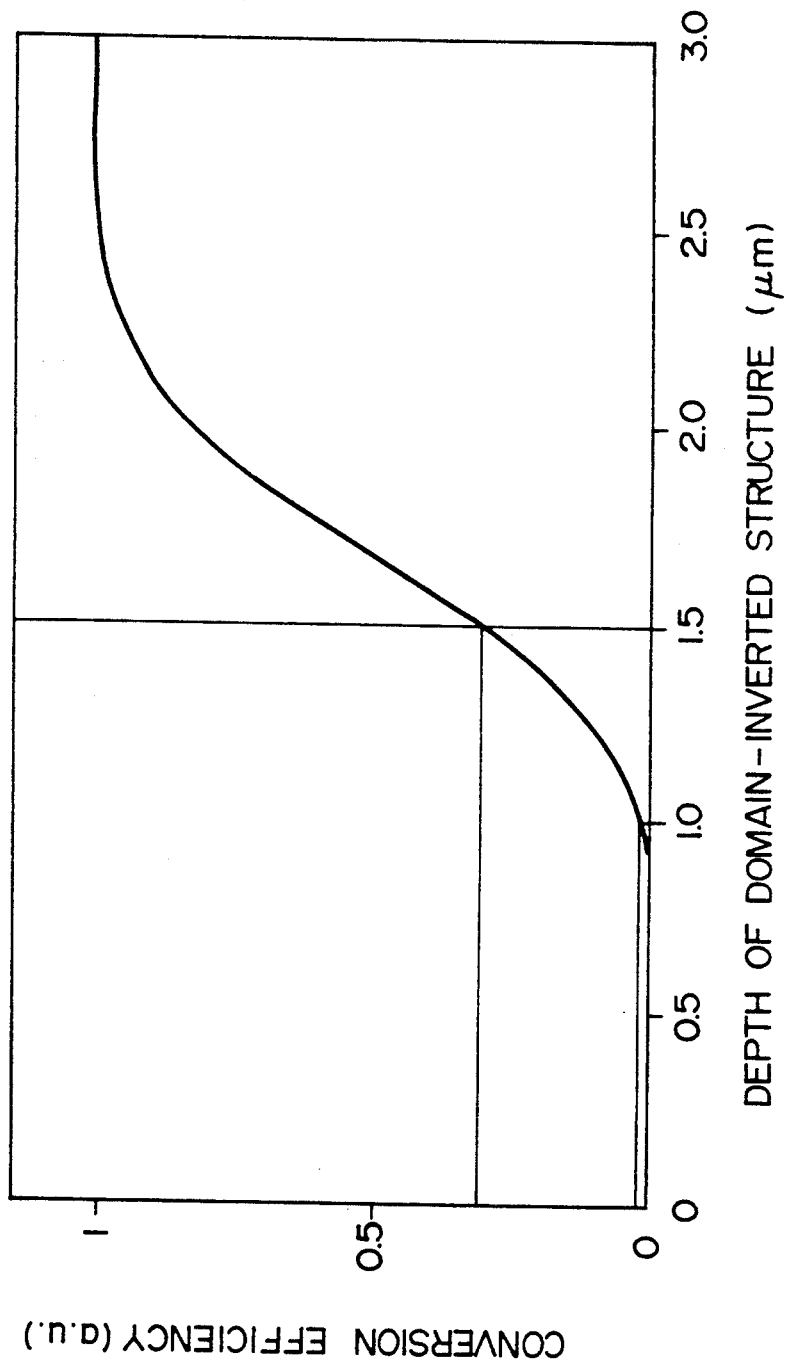
FIG. 11 a is graph which illustrates the relationship between the depth of the domain-inverted structure and an SHG output.

At the time of manufacturing an efficient waveguide conversion device, it is important to shorten the period of the inverted structure and to form the domain-inverted structure having a proper depth. Referring to FIG. 9a, 9b, 10a and 10b, explanation will be made of this reason. FIG. 10a are cross sectional views taken along the center line of the waveguide of the wavelength conversion device shown in FIG. 1. FIGS. 9b and FIG. 10b respectively are an enlarged view and a view which illustrate a distribution of the electric field of light that propagates through the waveguide. FIGS. 9a and 9b illustrate a case where the depth of the domain-inverted structure is shallow with respect to the depth of the waveguide, while FIGS. 10a and 10b illustrate a case where the depth of the domain-inverted structure is deep with respect to the depth of the waveguide. Referring to the drawings, reference numeral 4 represents the domain-inverted structure, 5 represents a proton-exchanged waveguide, 6 represents fundamental light, 7 represents SHG light, 16 represents the electric field distribution of fundamental light, 17 represents the electric field distribution of SHG light and 18 represents an overlap of the electric field distribution 10 of fundamental light, the electric field distribution 11 of SHG light and the domain-inverted structure 4. The efficiency of SHG is in proportion to the overlap 13 of the electric fields. As can be understood from FIGS. 9a, 9b, 10a and 10b, in a case where the depth of the domain-inverted structure 4 is shallow with respect to that of the proton-exchanged waveguide 5, the greater the overlap 13 of the electric fields, the deeper the depth of the domain-inverted structure 4 becomes. In proportion to this, the output of SHG increases. The result of calculations of the above-described relationship is shown in FIG. 11.

The relationship between the depth of the domain-inverted structure 4 and the SHG conversion efficiency when the proton-exchanged waveguide 5 being 2.4 μm was obtained. A fact can be understood that the SHG conversion efficiency considerably depends upon the depth of the domain-inverted structure 4 until the depth of the domain-inverted structure 4 reaches 2.4 μm. Therefore, a study was made about the deep domain-inverted structure 4, and the relationship between the heat treatment temperature and the shape of the domain-inverted structure 4 was measured. The proton-exchange layer 3, the width of which was 10 μm and the depth of which was 0.6 μm, was heat treated for 30 seconds by RTA so that the relationships among the heat treatment temperature and the width and the depth of the domain-inverted structure 4 was obtained. The results are shown in FIG. 12.

Figure 12:
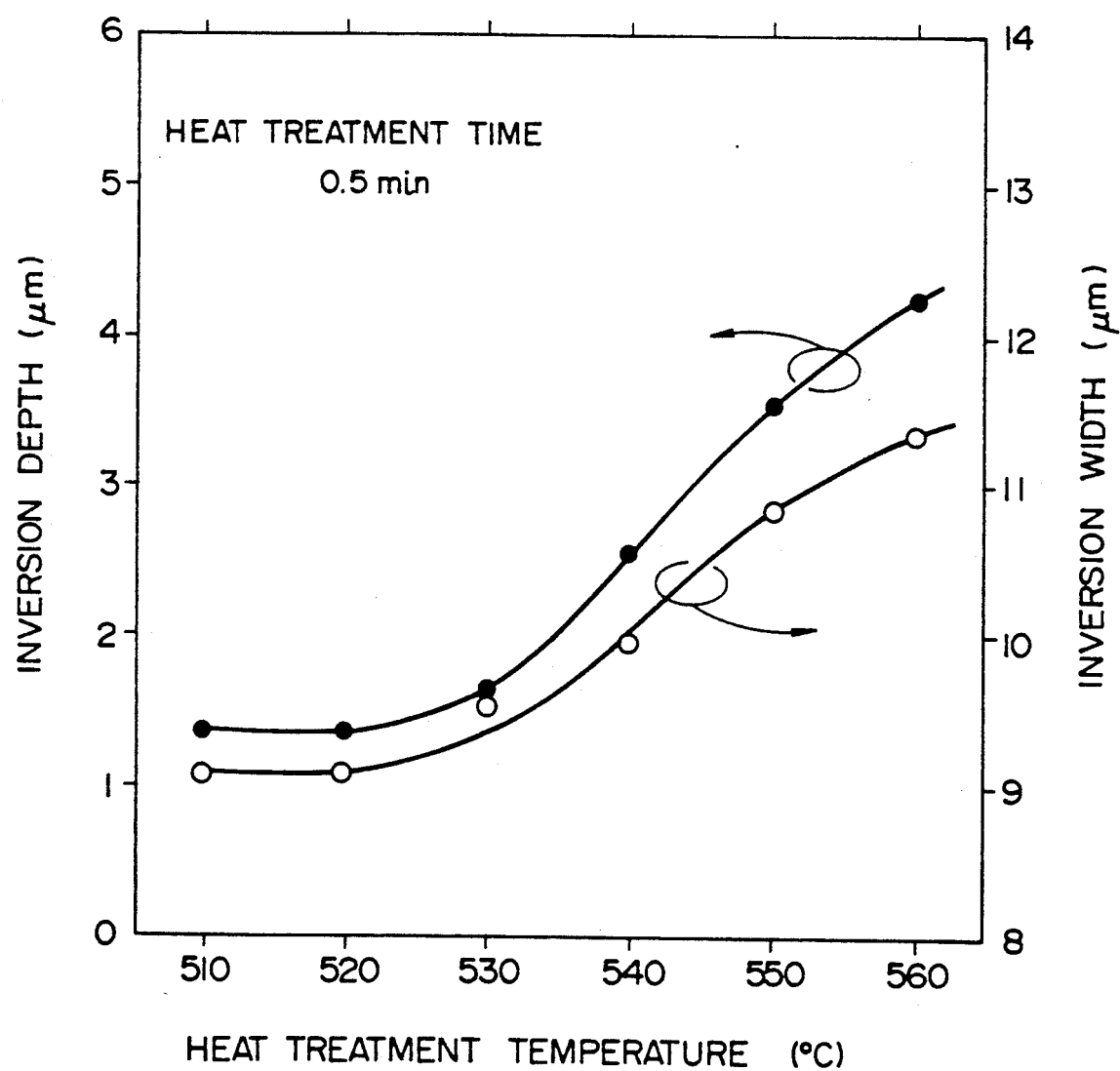
FIG. 12 is a graph which illustrates the relationship between the heat treatment temperature and the depth and the width of the domain-inverted structure.

As shown in FIG. 12, the domain-inverted structure 4 is enlarged in accordance with a rise in the heat treatment temperature and as well as the ratio of the width of the domain-inverted structure 4 and the depth of the same is changed. That is, the higher the temperature, the deeper the depth of the formed domain-inverted structure 4 is if the width is the same. As a result, a fact was found that the high temperature heat treatment enables the depth of the formed domain-inverted structure 4 to be deeper if the width is the same. The reason for this can be considered that the enlargement speed of the domain-inverted structure 4 has different temperature characteristics in the direction of the depth and in the widthwise direction and thereby the enlargement speed in the direction of the depth is in proportion to the temperature.

Figure 13A:
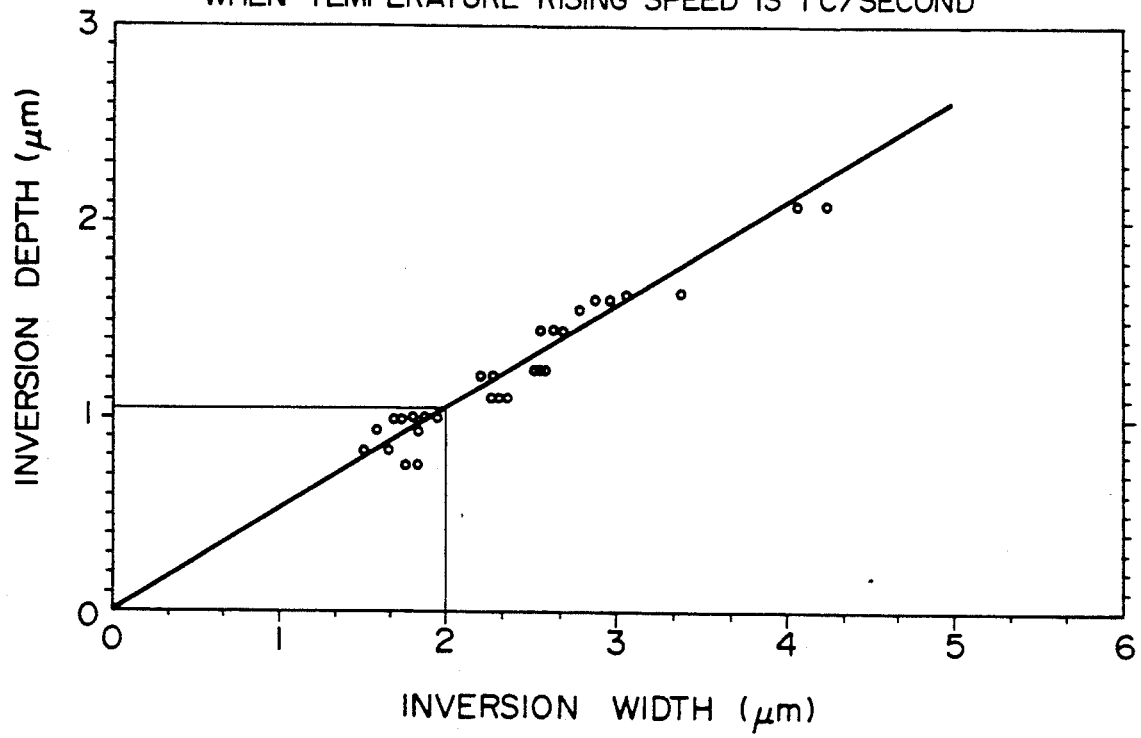
FIGS. 13a and 13b are graphs which illustrate the relationship between the width and the depth of the domain-inverted structure.
Figure 13B:
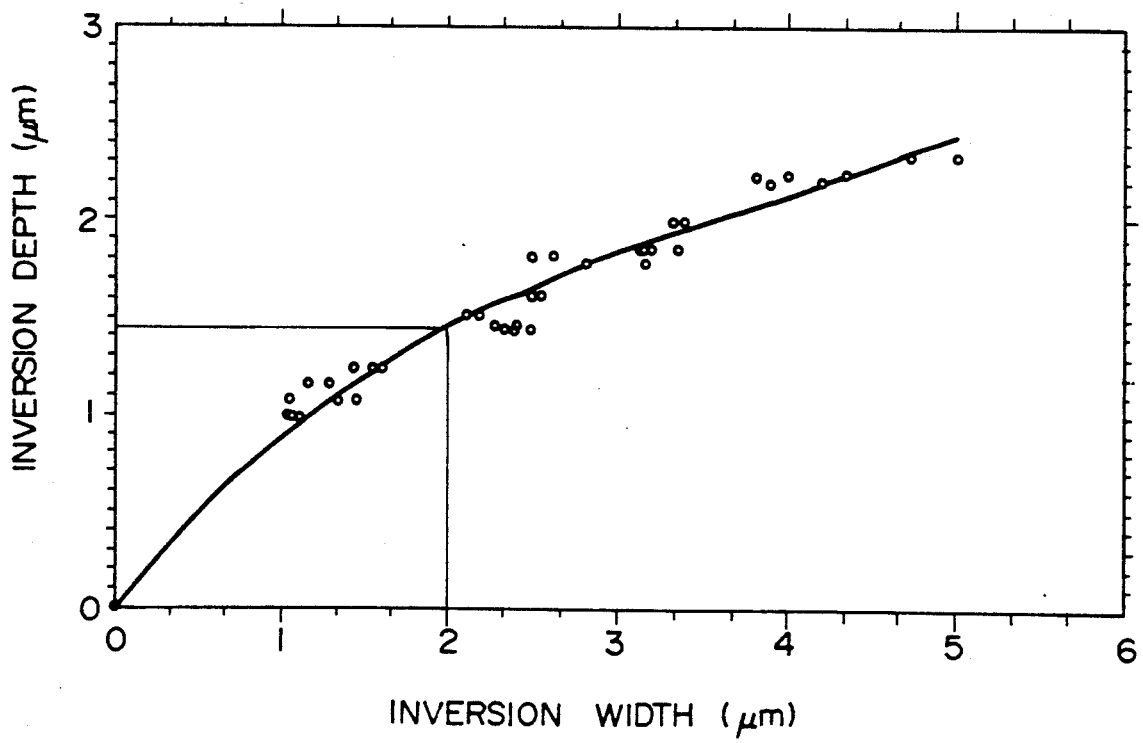

Another fact was found that the depth of the domain-inverted structure 4 also depends upon a heat rising speed at the time of the heat treatment. FIGS. 13a and 13b illustrate the relationship between the width and depth of the domain-inverted structure 4 formed by raising the temperature at a speed of 50° C./second by RTA and subjecting it to heat treatment at 55° C. for 30 seconds and those of the domain-inverted structure 4 formed by using the conventional furnace with which temperature wa raised at a speed of 1° C./second and in which heat treatment at 550° C. for 30 seconds was performed.

As a result of performing the high speed temperature rise by RTA, the domain-inverted structure 4 the width of which was 1 to 2 μm could be formed. Furthermore, the depth of the domain-inverted structure 4 could be further deeper within a range between 1 μm and 5 μm if the width thereof is fixed. The reason for this can be considered that the electric field is enlarged due to the pyroelectricity effect when the heat treatment is performed in a short time, thereby a very large electric field is generated if the temperature is raised at a high speed and the enlargement of the domain-inverted structure in the direction of the depth is thereby promoted. For example, the depth of the domain-inverted structure having a width of 2 μm required to realize a period of 4 μm is about 1 μm if the heat treatment is performed at a temperature rising speed of 1° C./second. However, a domain-inverted structure the depth of which is 1.5 μm can be formed if the temperature is raised at a speed of 50° C./second. Then, the SHG conversion efficiency obtained by a method described with reference to FIG. 11 was calculated by using the above-described value. As a result, the wavelength conversion device formed at a temperature rising speed of 50° C./second is able to exhibit a high conversion efficiency which is 10 times as high as that of the waveguide conversion device formed at a temperature rising speed of 1° C./second.

The pyroelectricity effect is caused by a phenomenon in which the domain of the crystal is changed due to a change in the temperature of $LiTaO_3$ crystal and thereby the charge is generated on the surface of the substrate, causing an electric field to be generated. Since the charge due to the pyroelectricity effect is in proportion to the value of a change in the temperature, a large electric field can be generated by raising the temperature at a high speed.

As a result, the short-period domain-inverted structure 4 could be formed on the surface of $LiTaO_3$ by the heat treatment by RTA. Since the domain-inverted structure was deeper, the overlap of the waveguide mode therewith could be enlarged and thereby the waveguide conversion device exhibiting a high conversion efficiency could be formed.

The heat treatment in which the domain was inverted was carried out with the Ta mask 2 formed on the outer surface of the substrate. Since the Ta mask 2 has a considerably larger infrared ray absorption coefficient in comparison with that of the $LiTaO_3$ substrate, the temperature rising speed on the surface of the specimen can be increased by several times. As a result, the domain-inverted structure 4 having a further short period and a deeper domain inversion depth could be formed. Therefore, an efficient waveguide conversion device capable of performing the short wavelength conversion could be formed.

Although the direction of the growth of the domain-inverted structure 4 is in the transmission direction Y in this example, a similar device can be manufactured if the same is set in the transmission direction X.

Although the substrate is made of $LiTaO_3$ in this example, another $LiTaO_3$ plate into which MgO, Nb, Nd or the like is doped can be used to manufacture a similar device.

Although the infrared ray heating apparatus is used to serve as the heating apparatus in this example, another heating apparatus exhibiting a high temperature rising speed such as a flash lamp heating apparatus, a $CO_2$ laser heating apparatus or the like can be used to manufacture a similar device.

Although pyrophosphoric acid is used to perform the ion exchange in this example, another acid such as orthophosphoric acid, benzoic acid, sulfuric acid or the like may be employed.

Although the Ta film is used as the mask for preventing the ionization in this example, another film may be employed if it has an acid resistance such as $Ta_2O_5$, Pt, Au and the like.

Although the proton-exchanged waveguide is used as the waveguide in this example, another waveguide such as a Ti diffusion waveguide, an Nb diffusion waveguide, an ion injected waveguide and the like can be employed.

Although Ta is used to form the metal mask, another material such as Au, Pt, Ti and Ag can be used.

EXAMPLE 3

According to this example, there is provided a method of forming a low loss waveguide after the domain-inverted structure has been formed. In order to form a efficient wavelength conversion device, it is necessary to form the low loss guidewave on the domain-inverted structure 4. The method of forming the domain-inverted structure 4 described in Example 1 is arranged in such a manner that the proton-exchange layer 3 for forming the domain-inverted structure 4 is formed by the heat treatment. However, if the periodically domain-inverted structure 4 is formed, difference in the refractive index is generated between the domain-inverted structure 4 and the non-inverted structure because of the existence of a change in refractive the index between the proton-exchange layer 3 and the substrate. Therefore, a loss took place in the operation of guiding waves in a waveguide formed on the domain-inverted structure 4. Accordingly, a method of forming a low-loss waveguide on the domain-inverted structure 4 was studied.

Referring to FIGS. 17a to 17h, reference numeral 1 represents an LiTaO$_3$ substrate, 2 represents a Ta mask which is made of ionization-resistant mask material, 3 represents a proton-exchange layer, 4 represents a domain-inverted structure, 5 represents a proton-exchanged waveguide, 6 represents an inversion light waveguide and 13 represents a Ta mask made of the ionization resistant mask material. According to a process in this example, the LiTaO$_3$ crystal is heat treated at a temperature at which the domain is not inverted for the purpose of performing annealing so as to diffuse inversion treatment ions in the LiTaO$_3$ crystal.

The domain-inverted structure according to Example 1 was manufactured (see FIGS. 17a to 17d), and then the refractive index of the manufactured domain-inverted structure 4 was measured by a prism coupler method, that is, a difference in the refractive index from the substrate 1 was about 0.02. Referring to FIG. 17e, the substrate thus-manufactured was annealed at 450° C. for 4 hours. As a result, the difference in the refractive index between the domain-inverted structure 4 and the substrate 1 was 0.005 or less. Furthermore, when it was annealed at 550° C. or higher after the domain had been inverted, the domain, was re-inverted so that the domain-inverted structure 4 was eliminated.

Figure 17F:
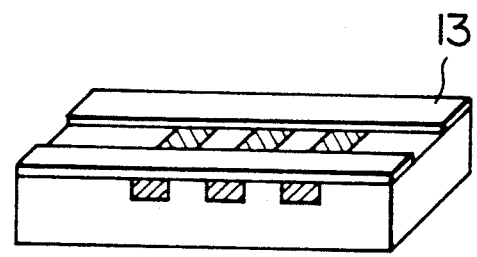
Figure 17G:
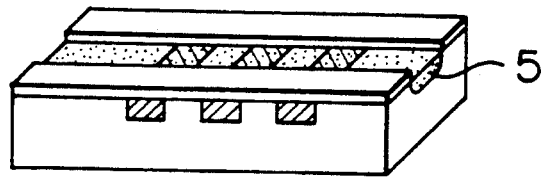
Figure 17H:
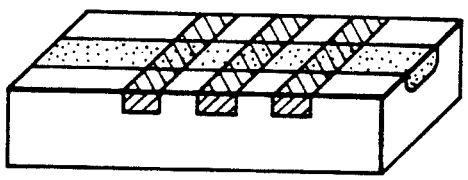

With the Ta mask 2 is formed on the LiTaO$_3$ substrate 1 by sputtering, after the resist is applied to the surface of the Ta mask 2, waveguide stripes the width of which is 6 μm are formed on the substrate in the transmission direction X of the substrate by a photolithographic process. Then, dry etching is performed in an atmosphere of CF$_4$ to form the Ta mask 13 as shown in FIG. 17f. Referring to FIG. 17g, the substrate is heat treated in pyrophosphoric acid at 230° C. for 20 minutes so as to subject the non-masked portion of the LiTaO$_3$ substrate to the proton exchange treatment. As a result, the proton-exchanged waveguide 5 is formed. Then, the Ta mask 13 is removed in the state shown in FIG. 17h before optically polishing the two end surfaces of the LiTaO$_3$ substrate so that the wavelength conversion device is manufactured.

The characteristics of the manufactured wavelength conversion device were compared. Three types of samples, that is, a sample 1 which was heat treated at 450° C. for one hour after the domain conversion, a sample 2 which was not heat treated after the domain conversion and a sample 3 which was heat treated at 550° C. for one hour, were manufactured. Then, semiconductor laser beams the wavelength of which was 800 μm and the output of the same was 40 mW were converged by a convergent optical system. The fundamental waves and SHG light emitted were collimated by a lens so as to be measured by a power meter. The results are shown in the following table:

TABLE 1

| Sample | Fundamental light output (mW) | Second higher harmonic wave output (mW) |
|---|---|---|
| Sample 1 | 20 | 0.5 |
| Sample 2 | 10 | 0.2 |
| Sample 3 | 20 | 0 |

As can be understood from results about samples 1 and 2 shown in Table 1, sample 1 exhibited the reduction in the difference in the refractive index of the domain-inverted structure 4 by virtue of annealing performed after the domain had been inverted. Therefore, the loss taken place in the waveguide of the wavelength conversion device was reduced from 2 dB/cm (sample 2) to 0.4 dB/cm. As a result, the waveguide loss of sample 1 was reduced and thereby the output of the fundamental waves was increased.

Furthermore, the output of SHG light was increased because the waveguide loss was reduced. As a result, a wavelength conversion device exhibiting an extremely excellent conversion efficiency was formed. Although the fundamental waves were guided in sample 3, no SHG light was generated. The reason for this can be considered that the domain-inverted structure 4 was reinverted so as to be eliminated due to the heat treatment at 550° C.

As described above, according to this example, the proton exchange was partially performed so that the periodically domain-inverted layer 4 was formed. Then, annealing was performed at 550° C. or lower. Therefore, a low-loss waveguide can be formed by the method according to this example because the waveguide loss can be reduced. As a result, a waveguide conversion device exhibiting an excellent conversion efficiency can be formed.

Although pyrophosphoric acid is used to perform the ion exchange according to this example, another acid such as phosphoric acid, stearic acid, benzoic acid, nitric acid, hydrochloric acid and sulfuric acid may be employed.

Although the Ta film is used as the ionization resistant mask in this example, another film may be employed if it has an acid resistance such as Ta$_2$O$_5$ and Pt and the like.

Although the substrate is made of LiTaO$_3$ according to this example, another LiTaO$_3$ plate into which MgO is doped can be used.

The results of the above-described examples are as follows:

According to Example 1, the periodic proton-exchange layer was formed so that the domain-inverted structure was formed by heat treating the proton-exchange layer. According to this example, the third-order period waveguide conversion device was formed but the first-order period could not be formed.

According to Example 2, the periodic proton-exchange layer was formed on the LiTaO$_3$ substrate and the proton-exchange layer was subjected to a heat treatment in which the temperature is increased at a high speed so that the waveguide conversion device having a first-order domain-inverted structure could be formed.

According to Example 3, the domain-inverted structure was heat treated so that the difference in the refractive index from that of the substrate was reduced.

Then, the characteristics of the wavelength conversion device formed by the method according to the above-described example was evaluated.

Characteristics of Wavelength Conversion Device

The characteristics of the wavelength conversion device will now be described. The waveguide 5 according to Example 3 was formed on the domain-inverted structure 4 according to Example 1 so that the third-order period wavelength conversion device was manufactured. The wavelength conversion device wa manufactured by forming the proton-exchanged waveguide the width of which was 5 μm, the depth of which was 2.4 μm and the length of which was 9 μm on the domain-inverted layer 4 the period of which was 10.5 μm, the width of which was 6.0 μm and the depth of which was 2.7 μm. The SHG characteristics of the manufactured wavelength conversion device were measured. By using a Ti: Al$_2$O$_3$ sapphire laser the wavelength of which can be varied to perform scanning the wavelength of incidental light in a range between 840 and 880 nm so that a phasematch wavelength was obtained.

Figure 18:
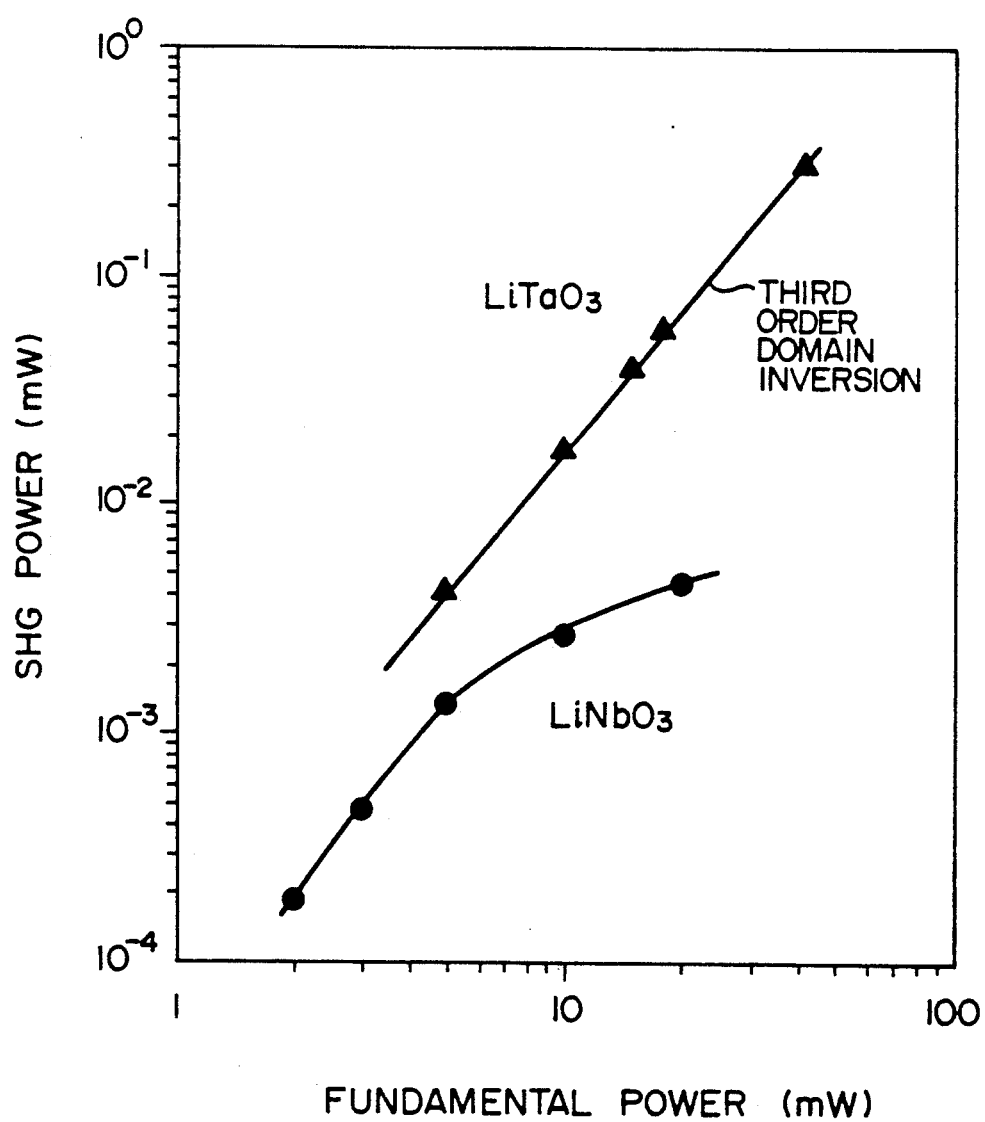
FIG. 18 is a graph which illustrates the SHG characteristics of the waveguide device according to the present invention.

FIG. 18 illustrates the SHG characteristics of the conventional wavelength conversion device manufactured by using LiNbO$_3$ and the wavelength conversion device having the third-order domain inversion period manufactured by using LiTaO$_3$. The wavelength conversion device manufactured by LiNbO$_3$ encountered a problem in that a large output cannot easily be made because its output was saturated at 10 μW or less, being caused by the generation of the optical damage. On the other hand, the device manufactured by using LiTaO$_3$ was free from deterioration in the output due to the optical damage. Furthermore, the wavelength conversion device manufactured by using LiTaO$_3$ exhibited an excellent efficient wavelength conversion of 27%/W in comparison with a conversion efficiency of 0.43%/W obtained by the conventional wavelength conversion device manufactured by using LiNbO$_3$.

Figure 19:
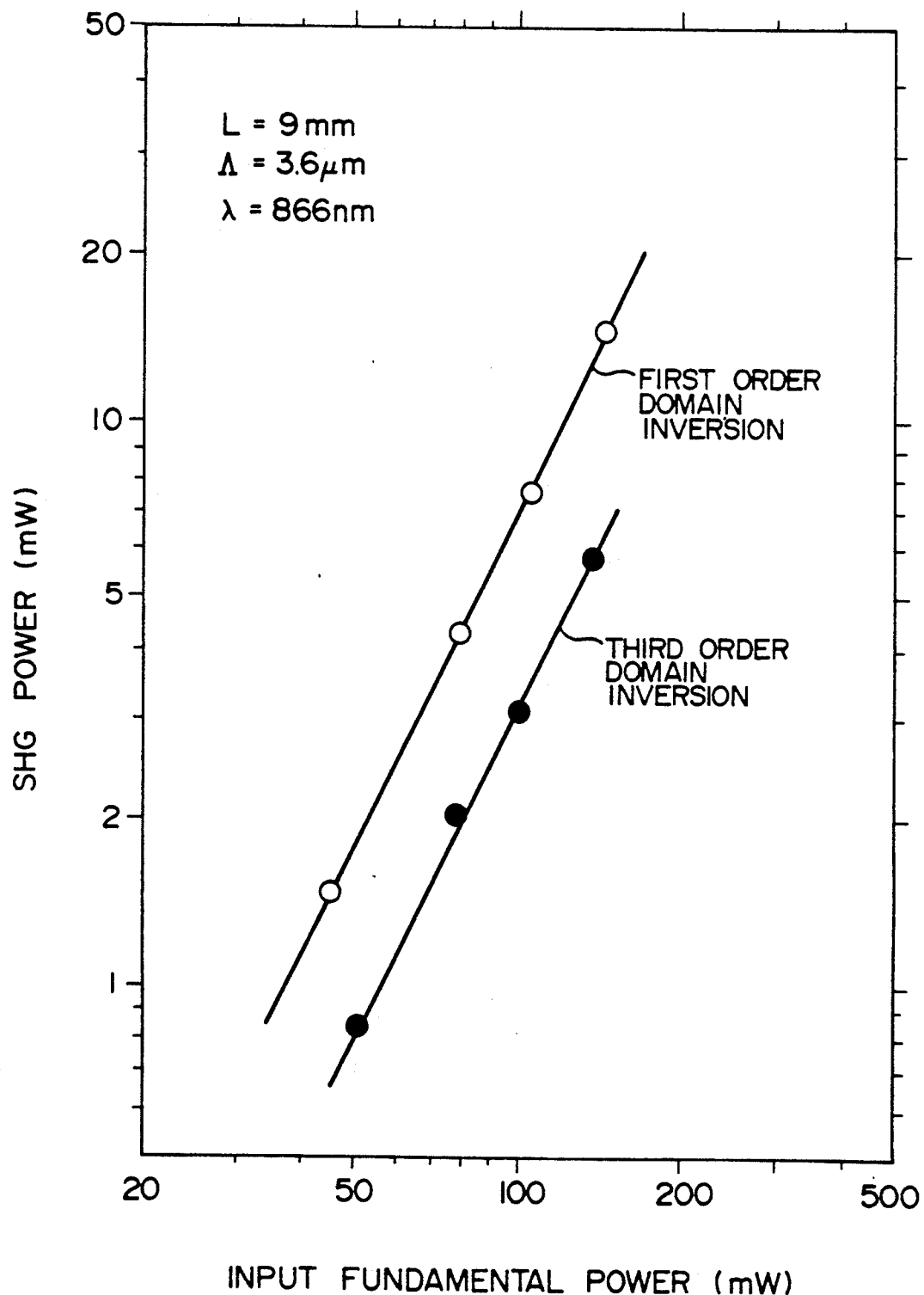
FIG. 19 is a graph which illustrates the SHG characteristics of the waveguide device according to the present invention.

In order to manufacture a wavelength conversion device exhibiting a further excellent efficiency, the wavelength conversion device having the first-order period was manufactured by forming the waveguide 5 according to Example 3 on the domain-inverted structure formed according to Example 2. The manufactured first-order wavelength conversion device and the third-order wavelength conversion device were subjected to a large output characteristics test. FIG. 19 illustrates the relationship between the intensity of incidental light and the SHG output of the wavelength conversion device having a third-order domain inversion period and that having a first-order domain inversion period. Also the device having the third-order domain inversion period and capable of realizing an output of 6 mW was obtained when the input was 150 mW. Therefore, a wavelength conversion device could be obtained which exhibited an excellent conversion efficiency of 27%/W and satisfactory large output.

Furthermore, the maximum output of 15 mW and a conversion efficiency of 71%/W were obtained in the wavelength conversion device having the first-order inversion period manufactured by RTA when an input of 145 mW was made, the values thus-obtained being an excellent efficiency which is 2.5 times as high as those of the wavelength conversion device having the third-order domain inversion period. The reason for this lies in that the domain-inverted structure 4 having first-order period could be formed by RTA and the depth of the domain-inverted structure was increased. Therefore, the a deep domain-inverted layer could be formed although the period is short. In addition, a high efficiency conversion could be performed by virtue of the low loss waveguide 5.

EXAMPLE 4

Finally, a method of manufacturing a module using the wavelength conversion device according to the present invention will now be described.

Figure 20:
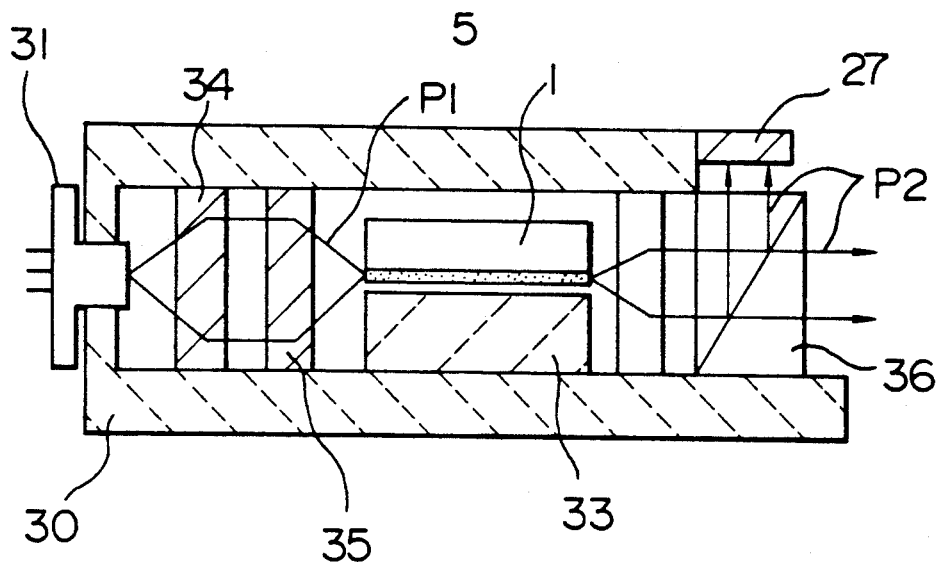
FIG. 20 is a structural cross-sectional view which illustrates a shortwave laser beam source according to the present invention.
Figure 21:
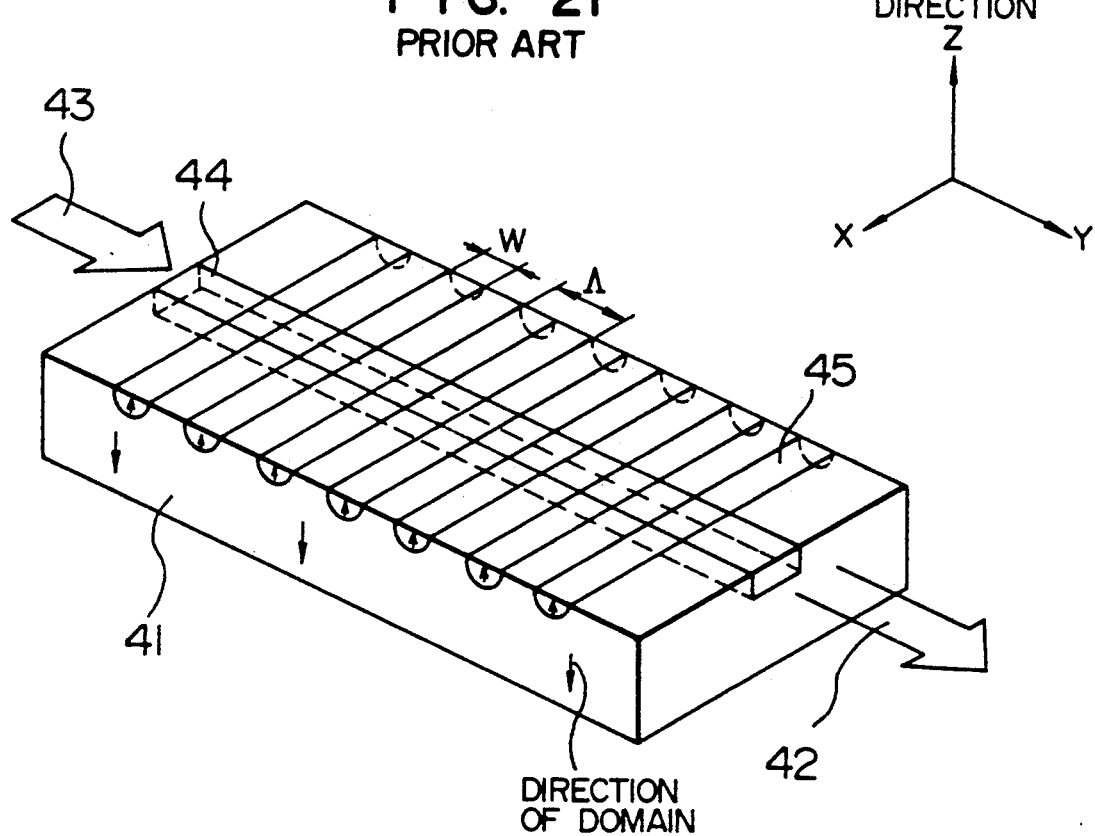
FIG. 21 is a structural view which illustrates a conventional wavelength conversion device.
Figure 22A:
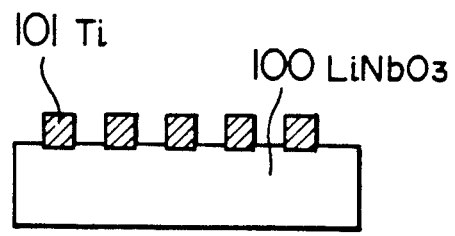
FIGS. 22a to 22c are cross-sectional views which illustrate the steps of a method of manufacturing the conventional wavelength conversion device.
Figure 22B:
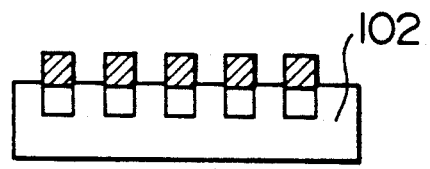
Figure 22C:
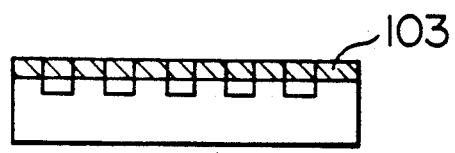

FIG. 20 illustrates a short wavelength laser light source structured by combining a semiconductor laser the wavelength of which falls in a band of 0.8 μm and the wavelength conversion device according to Example 1. Laser beams emitted from a semiconductor laser 31 are converged by converging optical systems 34 and 35 so as to make them incident upon the waveguide end surface 5 of the wavelength conversion device. By integrally forming them to manufacture a module, a very small wavelength light source could be formed. The light source thus-manufactured exhibits a very large output of 2 mW and the same can be applied to a light source for an optical disk or the like because of its small size. As a result of the short wavelength light source, the storage capacity of an optical disk can significantly be enlarged so that a very small device could be manufactured.

As described above, the periodic proton-exchange layer 3 is formed in the LiTaO$_3$ crystal and it is heat treated to form the domain-inverted structure 4 in such a manner that the temperature rising speed is raised. As a result, the undesired diffusion of the proton-exchange layer 3 which is taken place at the moment during which the domain inversion processing temperature is achieved can be prevented. Therefore, the crosswise expansion of the domain inversion to be formed in the proton-exchange layer 3 can be prevented. As a result, since a very short period domain-inverted structure 4 can be formed, and since the short wavelength conversion can be performed with a high degree of efficiency, a large output wavelength conversion device can be manufactured by using LiTaO$_3$ crystal, exhibiting an excellent optical damage resistance. Therefore, a significantly excellent practical effect can be obtained.

When the periodic proton-exchange layer 3 was formed in the LiTaO$_3$ crystal, the depth of the exchange of the proton was restricted so as to prevent undesirable inter-connection of the adjacent proton-exchanged layers 3. Furthermore, the minimum thickness of the proton exchange with which the domain-inverted structure 4 can be formed was restricted. Although the thickness of the domain-inverted structure 4 depends upon the thickness of the proton-exchanged layer 3, the domain-inverted structure can be formed under a condition such that the proton-exchange layer is 0.2 μm or more. As a result, by restricting the thickness of the proton-exchange layer, the domain-inverted structure can be formed and the wavelength conversion device can be formed by using the LiTaO3 crystal having a large non-linear optical constant and exhibiting a satisfactory optical damage resistance. Therefore, a significant practical effect can be obtained in that an efficient, large output and stable wavelength conversion device can be manufactured.

Furthermore, the proton exchange treatment is partially applied to the LiTaO3 crystal before heating it to a temperature below the Curie point but in the vicinity of the Curie point so that the periodically domain-inverted structure 4 can be formed. In addition, by performing the heat treatment at a low temperature below 500° C. to reduce the proton exchange density of the domain-inverted structure 4 while maintaining the domain-inverted structure, the refractive index of the domain-inverted structure 4 can be set to a value adjacent to the refractive index of the substrate. As a result, the technology which has not been realized according to the conventional structure can be realized in that the periodical domain inversion can be formed in the LiTaO3 crystal. Furthermore, by reducing the difference in the refractive index between the domain-inverted structure 4 and the substrate, a low loss wavelength conversion device exhibiting an excellent conversion efficiency can be manufactured. Consequently, a significantly practical effect can be obtained.

Although the invention has been described in its preferred form with a certain degree of particulary, it is understood that the present disclosure of the preferred form has been changed in the details of construction and the combination and arrangement of parts may be resorted to without departing from the spirit and the scope of the invention as hereinafter claimed.

What is claimed is:

1. A method of manufacturing a wavelength conversion device comprising the steps of:
   forming a stripe-like mask on a -C-surface of an LiTaO3 substrate made of a C-plate;
   forming a proton-exchange layer having a thickness of more than 0.2 μm in said -C-surface in non-masked portions by subjecting said LiTaO3 substrate to proton exchange treatment to exchange Li and H+ ions in said LiTaO3 substrate; and
   forming a domain-inverted structure by subjecting said LiTaO3 substrate to heat treatment at a temperature higher than 450° C.

2. A method of manufacturing a wavelength conversion device comprising the steps of:
   forming stripe-like mask comprising strips having a period $\Lambda$ and a stripe width W (where $W < \Lambda$) on a -C-surface of an LiTaO3 substrate made of a C-plate;
   forming a proton-exchange layer having a depth of D on said -C-surface in non-masked portions by subjecting said LiTaO3 substrate to proton-exchange treatment to exchange Li and H+ ions in said LiTaO3 substrate; and
   forming a domain-inverted structure by heating said LiTaO3 substrate at a temperature which is higher than 450° C. and lower than the Curie point of LiTaO3, wherein said thickness D of said proton-exchange layer holds a relationship such that $0.2 \mu m < D < (\Lambda - W)/2$.

3. A method of manufacturing a wavelength conversion device comprising the steps of:
   forming a stripe-like mask on a -C-surface of an LiTaO3 substrate made of a C-plate;
   forming a proton-exchange layer having a thickness of more than 0.2 μm on said -C-surface in non-masked portions by subjecting said LiTaO3 substrate to proton-exchange treatment to exchange Li and H+ ions in said LiTaO3 substrate;
   forming a domain-inverted structure by heating said LiTaO3 substrate at a temperature which is higher than 450° C. and lower than the Curie point; and
   reducing a difference in refractive index between said domain-inverted structure and said substrate by subjecting said LiTaO3 substrate to heat treatment at 550° C. or lower.

4. A method of manufacturing a wavelength conversion device according to claim 1, wherein an infrared ray heating apparatus is used as a heating means for heating said LiTaO3 substrate.

5. A method of manufacturing a wavelength conversion device according to claim 1, wherein said step of forming said domain-inverted structure by subjecting said proton-exchange layer to heat treatment by using said heating means further include of increasing the temperature at a temperature rising speed S up to a temperature T and a step of heat treating said substrate at the temperature T, where said temperature rising speed S is higher than 0.5° C./second and said heat treatment temperature T is lower than the Curie point of said LiTaO3 substrate so that a third-order periodically drain-inverted structure is formed.

6. A method of manufacturing a wavelength conversion device according to claim 1, wherein said step of forming said domain-inverted structure by subjecting said proton-exchange layer to heat treatment by using said heating means further includes a step of increasing the temperature at a temperature rising speed S up to a temperature T and a step of heat treating the substrate at the temperature T, where said temperature rising speed S is higher than 15° C./second and said heat treatment temperature T is lower than the Curie point of said LiTaO3 substrate so that a first-order periodically drain-inverted structure is formed.

7. A method of manufacturing a wavelength conversion device according to claim 1, wherein said step of forming said domain-inverted structure by performing said heat treatment by using said heating means includes a process of covering the surface of said LiTaO3 substrate with a metal film.

8. A method of manufacturing a wavelength conversion device according to claim 2, wherein said step of forming said domain-inverted structure by performing said heat treatment by using said heating means includes a process of covering the surface of said LiTaO3 substrate with a metal film.

* * * * *